US011152667B2

(12) United States Patent
Sasaki et al.

(10) Patent No.: US 11,152,667 B2
(45) Date of Patent: Oct. 19, 2021

(54) PARTICULATE POLYMER FOR USE IN BINDER FOR LITHIUM-ION SECONDARY BATTERY; ADHESIVE LAYER; AND POROUS-MEMBRANE COMPOSITION

(71) Applicant: ZEON CORPORATION, Tokyo (JP)

(72) Inventors: Tomokazu Sasaki, Tokyo (JP); Junnosuke Akiike, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 373 days.

(21) Appl. No.: 15/030,679

(22) PCT Filed: Oct. 20, 2014

(86) PCT No.: PCT/JP2014/077852
§ 371 (c)(1),
(2) Date: Apr. 20, 2016

(87) PCT Pub. No.: WO2015/064411
PCT Pub. Date: May 7, 2015

(65) Prior Publication Data
US 2016/0268565 A1 Sep. 15, 2016

(30) Foreign Application Priority Data

Oct. 31, 2013 (JP) .............................. JP2013-227155

(51) Int. Cl.
*H01M 4/62* (2006.01)
*H01M 50/446* (2021.01)
*H01M 10/0525* (2010.01)
*H01M 50/46* (2021.01)

(52) U.S. Cl.
CPC ......... *H01M 50/446* (2021.01); *H01M 4/622* (2013.01); *H01M 10/0525* (2013.01); *H01M 50/461* (2021.01); *H01M 2220/30* (2013.01)

(58) Field of Classification Search
CPC .............................. H01M 4/622; H01M 4/623
USPC .......................................................... 429/217
See application file for complete search history.

(56) References Cited

U.S. PATENT DOCUMENTS

| | | | |
|---|---|---|---|
| 2003/0113626 A1* | 6/2003 | Maeda | H01M 4/621 |
| | | | 429/217 |
| 2013/0224555 A1 | 8/2013 | Chul et al. | |
| 2013/0273421 A1* | 10/2013 | Matsumura | 429/211 |
| 2014/0227603 A1 | 8/2014 | Ogata | |
| 2015/0333308 A1 | 11/2015 | Toyoda et al. | |

FOREIGN PATENT DOCUMENTS

| | | | | |
|---|---|---|---|---|
| CN | 102742051 A | 10/2012 | | |
| CN | 103296236 A | 9/2013 | | |
| JP | 62164783 A | * 7/1987 | | |
| KR | 1020080104045 A | 11/2008 | | |
| KR | 1020120094003 A | 8/2012 | | |
| WO | WO 2012046843 | * 4/2012 | ......... | H01M 2/1653 |
| WO | 2013/047853 A1 | 4/2013 | | |
| WO | 2013151144 A1 | 10/2013 | | |

OTHER PUBLICATIONS

Translation of Akahori JP 62164783 A (Year: 2021).*
May 3, 2016, International Preliminary Report on Patentability issued in the International Patent Application No. PCT/JP2014/077852.

* cited by examiner

*Primary Examiner* — Magali P Slawski
(74) *Attorney, Agent, or Firm* — Kenja IP Law PC

(57) ABSTRACT

A particulate polymer for a binder of a lithium ion secondary battery, wherein ion conductivity of a film formed by the particulate polymer after being immersed in an electrolytic solution at 60° C. for 72 hours is $1\times10^{-5}$ S/cm to $1\times10^{3}$ S/cm, and tensile strength of the film is 500 N/cm$^2$ to 4000 N/cm$^2$.

8 Claims, No Drawings

PARTICULATE POLYMER FOR USE IN BINDER FOR LITHIUM-ION SECONDARY BATTERY; ADHESIVE LAYER; AND POROUS-MEMBRANE COMPOSITION

FIELD

The present invention relates to a particulate polymer for a binder of a lithium ion secondary battery, and an adhesive layer and a porous membrane composition containing the binder.

BACKGROUND

Mobile terminals such as laptop personal computers, cellular phones, and personal digital assistants (PDAs) are being remarkably widespread. As the secondary batteries that are used as the power sources in these mobile terminals, lithium ion secondary batteries are often used.

In the lithium ion secondary battery, a separator is generally provided in order to prevent short circuit between a positive electrode and a negative electrode. If necessary, such a separator may be provided with a porous membrane on a separator substrate. As an example of such a porous membrane, there is known a membrane containing non-conductive particles and a binder effecting adhesion between the non-conductive particles (see Patent Literature 1).

CITATION LIST

Patent Document

Patent Literature 1: International Publication WO No. 2013/047853

SUMMARY

Technical Problem

In the lithium ion secondary batteries in prior art, improvement in adhesiveness between members constituting an electrode thereof in an electrolytic solution has been desired.

An example of possible strategies for increasing adhesiveness between the members constituting the battery in the electrolytic solution may be employment of a binder having good adhesiveness as the binder included in the constituent member of the battery. Some of the constituent members of the battery include a component called a binder that is a component having adhesiveness. It is expected that improvement of the adhesiveness of the binder may improve the adhesiveness between the constituent members of the battery in the electrolytic solution. The binder in prior art does not however have sufficient performance from the viewpoint of improvement in battery properties such as low temperature output property.

Another example of possible strategy for increasing the adhesiveness between the members constituting the battery in the electrolytic solution may be provision of an adhesive layer between the members as disclosed in Patent Literature 1. The provision of the adhesive layer, however, increases internal resistance of the battery, resulting in insufficient low temperature output property.

The present invention has been made in view of the above-mentioned problems. It is an object of the present invention to provide: a particulate polymer for a binder of a lithium ion secondary battery that is excellent in adhesiveness in an electrolytic solution and is capable of improving low temperature output property of the lithium ion secondary battery; an adhesive layer for the lithium ion secondary battery that is excellent in adhesiveness in the electrolytic solution and is capable of improving the low temperature output property of the lithium ion secondary battery; and a porous membrane composition enabling production of a porous membrane that is excellent in adhesiveness in the electrolytic solution and is capable of improving the low temperature output property of the lithium ion secondary battery.

Solution to Problem

The inventors of the present invention have intensively studied to achieve the above-mentioned objects, and as a result, found out the following. That is, a particulate polymer for a binder of a lithium ion secondary battery is capable of exerting excellent adhesiveness in the electrolytic solution and is capable of improving low temperature output property of the lithium ion secondary battery. The particulate polymer is the one which satisfies the specific requirements; when a film formed by the particulate polymer is immersed in an electrolytic solution under specific conditions, the film after the immersion has ion conductivity and tensile strength in specific ranges. The present invention have thus been completed.

That is, the present invention is as follows.

(1) A particulate polymer for a binder of a lithium ion secondary battery, wherein ion conductivity of a film formed by the particulate polymer after being immersed in an electrolytic solution at 60° C. for 72 hours is $1\times10^{-3}$ S/cm to $1\times10^{3}$ S/cm, and tensile strength of the film is 500 N/cm$^2$ to 4000 N/cm$^2$.

(2) The particulate polymer according to (1), wherein a volume average particle diameter of the particulate polymer is 0.01 μm to 1 μm.

(3) The particulate polymer according to (1) or (2), wherein the particulate polymer has a core-shell structure including a core portion and a shell portion partially covering an outer surface of the core portion.

(4) The particulate polymer according to (3), wherein a polymer forming the core portion of the particulate polymer contains a (meth)acrylic acid ester monomer unit and a (meth)acrylonitrile monomer unit at equal to or higher than 50% by weight in total.

(5) The particulate polymer according to (3) or (4), wherein a polymer forming the core portion of the particulate polymer contains a crosslinkable monomer unit.

(6) The particulate polymer according to any one of (3) to (5), wherein a polymer forming the core portion of the particulate polymer contains a fluorine group-containing monomer unit.

(7) The particulate polymer according to any one of (3) to (6), wherein a polymer forming the shell portion of the particulate polymer contains an aromatic vinyl monomer unit at equal to or higher than 20% by weight.

(8) An adhesive layer for effecting adhesion between members included in a lithium ion secondary battery, wherein the adhesive layer contains the particulate polymer according to any one of (1) to (7).

(9) A porous membrane composition comprising non-conductive particles, and the particulate polymer according to any one of (1) to (7).

Advantageous Effects of Invention

The particulate polymer for a binder of a lithium ion secondary battery according to the present invention is excellent in adhesiveness in an electrolytic solution and is capable of improving low temperature output property of the lithium ion secondary battery.

The adhesive layer for the lithium ion secondary battery according to the present invention is excellent in adhesiveness in an electrolytic solution and is capable of improving low temperature output property of the lithium ion secondary battery.

The porous membrane composition according to the present invention enables production of a porous membrane that is excellent in adhesiveness in an electrolytic solution and is capable of improving the temperature output property of the lithium ion secondary battery.

DESCRIPTION OF EMBODIMENTS

The present invention will be described hereinbelow in detail by illustrating embodiments and exemplifications, but the present invention is not limited to the following embodiments and exemplifications. The present invention may be optionally changed for implementation without departing from the scope of the present invention and equivalents thereto.

In the following description, (meth)acrylic acid includes acrylic acid and methacrylic acid. (Meth)acrylate includes acrylate and methacrylate. (Meth)acrylonitrile includes acrylonitrile and methacrylonitrile. Furthermore, (meth)acrylamide includes acrylamide and methacrylamide.

That a certain substance is water-soluble means that when 0.5 g of the substance is dissolved in 100 g of water at 25° C., an insoluble content is equal to or more than 0% by weight and less than 1.0% by weight. On the other hand, that a certain substance is water-insoluble means that when 0.5 g of the substance is dissolved in 100 g of water at 25° C., an insoluble content is equal to or more than 90% by weight and equal to or less than 100% by weight.

In a polymer that is produced by copolymerizing monomers of a plurality of types, a ratio of a structural unit formed by polymerizing a certain monomer in the polymer is usually, unless otherwise noted, equal to a ratio of the certain monomer with respect to all of the monomers used for polymerization of the polymer (charged amount ratio).

A "monomer composition" is used as a terminology indicating not only a composition containing monomers of equal to or more than two types but also monomers of one type.

[1. Particulate Polymer]
[1.1. Outline of Particulate Polymer]

The particulate polymer of the present invention is used as a binder for a lithium ion secondary battery. Ion conductivity and tensile strength of a film formed by the particulate polymer after being immersed in an electrolytic solution under specific conditions are within specific ranges. The particulate polymer of the present invention that satisfies the requirement may be used as a binder for a porous membrane, an electrode active material layer, and an adhesive layer, for example.

Use of such a particulate polymer as the binder for the lithium ion secondary battery brings about the following advantages.

i. The particulate polymer of the present invention exerts excellent adhesiveness in the electrolytic solution of the lithium ion secondary battery. When the porous membrane and the electrode active material layer contain the particulate polymer of the present invention, for example, the particulate polymer can thus strongly bind any particles contained in the porous membrane and the electrode active material layer, thereby increasing mechanical strengths of the porous membrane and the electrode active material layer. Furthermore, the adhesiveness between the porous membrane and the electrode active material layer themselves and optional members included in the battery in the electrolytic solution can be increased. As specific examples, adhesiveness between the porous membrane and a separator substrate, adhesiveness between the porous membrane and an electrode plate, and adhesiveness between the electrode active material layer and a current collector can be increased. For example, when an adhesive layer for effecting adhesion of the members included in the lithium ion secondary battery contains the particulate polymer of the present invention, adhesiveness between the adhesive layer and any member included in the battery in the electrolytic solution can also be increased. As a specific example, when the adhesive layer containing the particulate polymer of the present invention is provided between the separator and the electrode plate, the adhesive layer can strongly bind the separator and the electrode plate.

ii. Use of the particulate polymer of the present invention can give preferable low temperature output property of the lithium ion secondary battery.

iii. Use of the particulate polymer of the present invention can usually give preferable high temperature cycle property of the lithium ion secondary battery.

iv. Use of the particulate polymer of the present invention can usually give preferable low temperature reception property of the lithium ion secondary battery.

The mechanism that gives these excellent effects has not been clearly found. According to the studies by the inventors of the present invention, it is assumed that these excellent effects are provided based on the following reasons. However, the present invention is not limited by the following assumption.

i. Adhesiveness:

The film formed using the particulate polymer of the present invention has high tensile strength when immersed in the electrolytic solution. The high tensile strength indicates high adhesive force between the particulate polymers in a state where the particulate polymer is immersed in the electrolytic solution. It is considered that the mechanical strength of the particulate polymer itself is high in a state where it is immersed in the electrolytic solution because the tensile strength of the particulate polymer of the present invention is high.

In prior art, a polymer having high tensile strength has been known. The polymer can be therefore used as the binder for the lithium ion secondary battery. The binder, however, is immersed in the electrolytic solution in the lithium ion secondary battery. In general, immersion of the polymer in liquid may change mechanical properties thereof due to swelling. That is, even the polymer having high tensile strength in a dry state does not necessarily have high tensile strength in the electrolytic solution. In consideration of these circumstances, the present invention focusing on the tensile strength in the state where the polymer is immersed in the electrolytic solution has technical significance in use of the polymer as the binder for the lithium ion secondary battery.

ii. Low-Temperature Output Property:

The film formed using the particulate polymer of the present invention has high ion conductivity when immersed in the electrolytic solution. The particulate polymer of the present invention therefore has low tendency of inhibiting migration of ions in a state of being immersed in the electrolytic solution. Furthermore, the particulate polymer having high ion conductivity usually has high affinity with the electrolytic solution. Therefore, the particulate polymer having high ion conductivity can easily soak up the electrolytic solution and is excellent in capability of holding the electrolytic solution. The electrolytic solution can therefore permeate the electrode active material layer, the porous membrane, and the adhesive layer containing the particulate polymer. It is assumed that the use of the particulate polymer of the present invention can accordingly lower internal resistance of the lithium ion secondary battery and can therefore give preferable low temperature output property of the lithium ion secondary battery. The studies by the inventors of the present invention have revealed that although the low temperature output property is improved when the ion conductivity of the film is equal to or higher than a specific boundary value, the low temperature output property does not necessarily become better as the ion conductivity is higher in a range of equal to or higher than the specific value. The following can be assumed based on this finding. That is, there is the boundary value of the ion conductivity of the film, which has critical significance in improvement in the low temperature output property of the battery, and elements other than the ion conductivity may influence on the improvement in the low temperature output property in the range where the ion conductivity is equal to or higher than the boundary value.

iii. High Temperature Cycle Property:

Repeated charging and discharging of the lithium ion secondary battery may cause, for example, decomposition of the electrolytic solution and additives, which may cause gas generation. Furthermore, the charging and discharging of the lithium ion secondary battery may cause expansion and contraction of the electrode active material. Due to them, when the charging and discharging of the lithium ion secondary battery are repeated, pore spaces may generate in the battery to gradually increase a distance between a positive electrode and a negative electrode, and breakage of a conducting path may occur, resulting in lowering of battery capacity.

By contrast, the particulate polymer of the present invention has high adhesive force in the electrolytic solution as described above. With the lithium ion secondary battery using the particulate polymer of the present invention as the binder, even when the charging and discharging are repeated, the increase in the distance between the positive electrode and the negative electrode and the breakage of the conducting path do not easily occur.

Furthermore, as described above, the particulate polymer having high ion conductivity usually has excellent capability of holding the electrolytic solution. With the excellent capability, even when the distance between the positive electrode and the negative electrode is increased, the pore spaces generated with the increased distance between the positive electrode and the negative electrode can be filled with the electrolytic solution rapidly.

It is assumed that the use of the particulate polymer of the present invention can accordingly give preferably high temperature cycle property of the lithium ion secondary battery.

iv. Low Temperature Reception Property:

As described above, the particulate polymer of the present invention has low tendency of inhibiting the migration of ions in the state of being immersed in the electrolytic solution. The ions in the lithium ion secondary battery can usually migrate smoothly even at a low temperature. It is assumed that the low temperature reception property can accordingly be made preferable.

[1.2. Ion Conductivity of Film Formed by Particulate Polymer]

The ion conductivity of the film formed by the particulate polymer of the present invention after being immersed in the electrolytic solution at 60° C. for 72 hours is within a specific range. The ion conductivity is usually equal to or higher than $1 \times 10^{-3}$ S/cm, preferably equal to or higher than $5 \times 10^{-3}$ S/cm, and more preferably equal to or higher than $1 \times 10^{-4}$ S/cm, and is usually equal to or lower than $1 \times 10^{3}$ S/cm, preferably equal to or lower than $5 \times 10^{2}$ S/cm, and more preferably equal to or lower than $1 \times 10^{2}$ S/cm. By setting the ion conductivity to be equal to or higher than the lower limit of the above-mentioned range, the low temperature output property can be made preferable. Furthermore, the low temperature reception property can be made preferable usually. By setting the ion conductivity to be equal to or lower than the upper limit of the above-mentioned range, the high temperature cycle property can be made preferable.

The ion conductivity is a value obtained by forming a film of the particulate polymer that has a thickness of 1 mm, a length of 1 cm, and a width of 1 cm, immersing the film in the electrolytic solution at 60° C. for 72 hours, and then measuring the ion conductivity of the film. The technical scope of the present invention encompasses the particulate polymer having this value that is within the above-mentioned range of the ion conductivity.

For example, the ion conductivity may be measured in the following manner. First, a film of the particulate polymer is prepared. When the particulate polymer is prepared as an aqueous dispersion in which the particulate polymer is dispersed in water, the aqueous dispersion containing the particulate polymer is poured into a silicon container and dried at 60° C. for 72 hours, to prepare the film. In this case, the film may be thermally pressed at a temperature of 100° C. to 200° C. if necessary. The size of the film is set to 1 mm in thickness, 1 cm in length, and 1 cm in width. The film is immersed in the electrolytic solution at 60° C. for 72 hours and the thickness d of the film after the immersion is measured. Thereafter, the film is interposed between two copper foils and resistance R is measured from an alternating current impedance in a range of 0.001 Hz to 1000000 Hz. The ion conductivity of $R \times 1/d$ may be calculated using the thickness d and the resistance R.

As the electrolytic solution that is used for measuring the ion conductivity, a solution in which $LiPF_6$ as a supporting electrolyte is dissolved at a concentration of 1.0 mol/L in a mixed solvent of ethylene carbonate, diethyl carbonate, and vinylene carbonate may be used. In this case, a volume ratio of the solvents in the mixed solvent may be set to ethylene carbonate/diethyl carbonate/vinylene carbonate=68.5/30/1.5.

[1.3. Tensile Strength of Film Formed by Particulate Polymer]

The tensile strength of the film formed by the particulate polymer of the present invention after being immersed in the electrolytic solution at 60° C. for 72 hours is within a specific range. Specifically, The tensile strength is usually equal to or higher than 500 N/cm$^2$, preferably equal to or higher than 550 N/cm$^2$, and more preferably equal to or higher than 600 N/cm$^2$, and usually equal to or lower than 4000 N/cm$^2$, preferably equal to or lower than 3500 N/cm$^2$, and more preferably equal to or lower than 3000 N/cm$^2$. By setting the above-mentioned tensile strength to be equal to or higher than the lower limit of the above-mentioned range, the adhesiveness of the particulate polymer in the electrolytic solution can be increased. With the increase in the adhesiveness of the particulate polymer, for example, the mechanical strengths of the porous membrane and the electrode active material layer containing the particulate polymer can be increased and adhesive forces of the porous membrane, the electrode active material layer, and the adhesive layer containing the particulate polymer to other members in the electrolytic solution can be increased. Furthermore, the high temperature cycle property of the lithium ion secondary battery can be improved. By setting the tensile strength to be equal to or lower than the upper limit of the above-mentioned range, the low temperature reception property can be made preferable.

The tensile strength is a value obtained by forming a film of the particulate polymer that has a thickness of 1 mm, a length of 1 cm, and a width of 8 cm, immersing the film in the electrolytic solution at 60° C. for 72 hours, and then measuring the tensile strength of the film. The technical scope of the present invention encompasses the particulate polymer having this value that is within the above-mentioned range of the tensile strength.

For example, the tensile strength may be measured in the following manner. First, a film of the particulate polymer is prepared. When the particulate polymer is prepared as, for example, an aqueous dispersion in which the particulate polymer is dispersed in water, the aqueous dispersion containing the particulate polymer is poured into a silicon container and dried at 60° C. for 72 hours, to prepare the film. In this case, the film may be thermally pressed at a temperature of 100° C. to 200° C. if necessary. The size of the film is set to 1 mm in thickness, 1 cm in length, and 8 cm in width. The film is immersed in the electrolytic solution at 60° C. for 72 hours, to effect swelling of the film. The swollen film is stretched at a speed of 50 ram/min in accordance with JIS-K5301 and the strength at the time of breakage is measured three times. An average value of the measured strengths at the time of breakage may be taken as the tensile strength of the film.

As the electrolytic solution that is used for measuring the tensile strength, the electrolytic solution that is the same as that used for measuring the ion conductivity may be used.

[1.4. Core-Shell Structure]

As the particulate polymer of the present invention, any particle polymer satisfying the above-mentioned requirement regarding the ion conductivity and the tensile strength may be used. In particular, the particulate polymer of the present invention preferably has a core-shell structure including a core portion and a shell portion covering the outer surface of the core portion.

The core portion of the particulate polymer having the core-shell structure is a portion at the inner side relative to the shell portion in the particulate polymer. The shell portion is a portion covering the outer surface of the core portion and is usually an outermost portion in the particulate polymer. The shell portion may cover the entire outer surface of the core portion but preferably covers a part of the outer surface of the core portion.

In the particulate polymer having the core-shell structure as described above, the core portion and the shell portion play different rolls, thereby effectively improving performance of the lithium ion secondary battery. For example, the core portion may be formed by a polymer excellent in ion conductivity and the shell portion may be formed by a polymer excellent in adhesiveness in the electrolytic solution. With this, both the adhesiveness of the particulate polymer in the electrolytic solution and the low temperature output property of the lithium ion secondary battery can be enhanced effectively.

(1.4.1. Core Portion)

As the monomer that is used for producing the polymer of the core portion, a (meth)acrylic acid ester monomer or a (meth)acrylonitrile monomer is preferably used. That is, the polymer of the core portion preferably contains a (meth)acrylic acid ester monomer unit or a (meth)acrylonitrile monomer unit. The polymer of the core portion may contain only the (meth)acrylic acid ester monomer unit, may contain only the (meth)acrylonitrile monomer unit, and may also contain the (meth)acrylic acid ester monomer unit and the (meth)acrylonitrile monomer unit in combination. The (meth)acrylic acid ester monomer unit is a structural unit having a structure that is formed by polymerization of the (meth)acrylic acid ester monomer. However, among the (meth)acrylic acid ester monomers, the one containing fluorine is regarded as a fluorine group-containing monomer, which will be described later, and is distinguished from the (meth)acrylic acid ester monomer. The (meth)acrylonitrile monomer unit is a structural unit having a structure that is formed by polymerization of (meth)acrylonitrile. With this, the ion conductivity of the core portion can be increased, thereby increasing the ion conductivity of the particulate polymer effectively.

Examples of the (meth)acrylic acid ester monomer may include methyl acrylate, ethyl acrylate, methyl methacrylate, ethyl methacrylate, and 2-ethylhexyl acrylate. One type thereof may be solely used, and two or more types thereof may also be used in combination at any ratio.

As the (meth)acrylonitrile monomer, acrylonitrile may be used, methacrylonitrile may be used, and acrylonitrile and methacrylonitrile may also be used in combination.

The ratio of the total of the (meth)acrylic acid ester monomer unit and the (meth)acrylonitrile monomer unit in the polymer of the core portion is preferably equal to or higher than 50% by weight, more preferably equal to or higher than 55% by weight more, still more preferably equal to or higher than 60% by weight, and particularly preferably equal to or higher than 70% by weight, and preferably equal to or lower than 99% by weight, more preferably equal to or lower than 95% by weight, and particularly preferably equal to or lower than 90% by weight. By setting the ratio of the (meth)acrylic acid ester monomer unit and the (meth)acrylonitrile monomer unit to be within the above-mentioned range, ion diffusion property of the adhesive layer can be increased. Furthermore, the low temperature output property of the lithium ion secondary battery can be further improved. By setting the ratio of the total of the (meth)acrylic acid ester monomer unit and the (meth)acrylonitrile monomer unit to be equal to or higher than the lower limit of the above-mentioned range, the ion conductivity of the particulate polymer can be increased. By setting the ratio to be equal to or lower than the upper limit, the strength of the core portion in the electrolytic solution can be increased and the adhesion strength of the particulate polymer can be increased.

The above-mentioned "total of the (meth)acrylic acid ester monomer unit and the (meth)acrylonitrile monomer unit" means that the polymer of the core portion may contain only the (meth)acrylic acid ester monomer unit, may contain only the (meth)acrylonitrile monomer unit, and may also contain the (meth)acrylic acid ester monomer unit and the (meth)acrylonitrile monomer unit in combination.

The polymer forming the core portion of the particulate polymer preferably contains a crosslinkable monomer unit. The crosslinkable monomer unit is a structural unit having a structure that is formed by polymerization of a crosslinkable monomer. The crosslinkable monomer is a monomer that is capable of forming a crosslinking structure during or after polymerization by heat or energy ray irradiation. When the polymer forming the core portion contains the crosslinkable monomer unit, the mechanical strength of the particulate polymer can be increased.

Examples of the crosslikable monomer may include a polyfunctional monomer having equal to or more than two polymerizable groups in the monomer. Examples of the polyfunctional monomer may include divinyl compounds such as divinylbenzene; di(meth)acrylic acid ester compounds such as ethylene dimethacrylate, diethylene glycol dimethacrylate, ethylene glycol dimethacrylate, diethylene glycol diacrylate, 1,3-butylene glycol diacrylate; tri(meth)acrylic acid ester compounds such as trimethylolpropane trimethacrylate and trimethylolpropane triacrylate; and ethylenically unsaturated monomers containing an epoxy group, such as allyl glycidyl ether and glycidyl methacrylate. Among them, the dimethacrylic acid ester compounds and the ethylenically unsaturated monomers containing an epoxy group are preferable, and the dimethacrylic acid ester compounds are more preferable. One type thereof may be solely used, and two or more types thereof may also be used in combination at any ratio.

The ratio of the crosslinkable monomer unit in the polymer forming the core portion is preferably equal to or higher than 0.1% by weight, more preferably equal to or higher than 0.2% by weight, and particularly preferably equal to or higher than 0.5% by weight, and preferably equal to or lower than 5% by weight, more preferably equal to or lower than 4% by weight, and particularly preferably equal to or lower than 3% by weight. By setting the ratio of the crosslinkable monomer unit to be equal to or higher than the lower limit, the adhesiveness of the particulate polymer in the electrolytic solution can be increased. By setting the ratio of the crosslinkable monomer unit to be equal to or lower than the upper limit, the high temperature cycle property of the secondary battery can be improved and the lifetime thereof can be therefore extended.

Furthermore, the polymer forming the core portion of the particulate polymer preferably contains a fluorine group-containing monomer unit. The fluorine group-containing monomer unit is a structural unit having a structure that is formed by polymerization of a fluorine group-containing monomer. The fluorine group-containing monomer is a monomer containing a fluorine group. When the polymer forming the core portion contains the fluorine group-containing monomer unit, the ion conductivity of the core portion can be increased, thereby increasing the ion conductivity of the particulate polymer effectively.

Examples of the fluorine group-containing monomer may include fluorine group-containing (meth)acrylic acid ester monomers and fluorine group-containing aromatic dien monomers. Among them, the fluorine group-containing (meth)acrylic acid ester monomers are preferable. As the fluorine group-containing (meth)acrylic acid ester monomer, a monomer represented by the following formula (I) is exemplified.

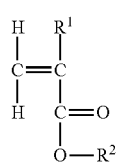

(I)

In the above-mentioned formula (I), $R^1$ represents a hydrogen atom or a methyl group.

In the above-mentioned formula (I), $R^2$ represents a hydrocarbon group containing a fluorine atom. The number of carbons in the hydrocarbon group is equal to or more than 1 preferably and equal to or less than 18 preferably. The number of fluorine atoms contained in $R^2$ may be one, and may also be equal to or more than 2.

Examples of the fluorine group-containing (meth)acrylic acid ester monomer represented by the formula (I) may include fluorinated alkyl (meth)acrylates, fluorinated aryl (meth)acrylates, and fluorinated aralkyl (meth)acrylates. Among them, fluorinated alkyl (meth)acrylates are preferable. Specific examples of such a monomer may include perfluoroalkyl (meth)acrylates such as 2,2,2-trifluoroethyl (meth)acrylate, β-(perfluorooctyl)ethyl (meth)acrylate, 2,2,3,3-tetrafluoropropyl (meth)acrylate, 2,2,3,4,4,4-hexafluorobutyl (meth)acrylate, 1H,1H,9H-perfluoro-1-nonyl (meth)acrylate, 1H,1H,11H-perfluoroundecyl (meth)acrylate, perfluorooctyl (meth)acrylate, perfluoroethyl (meth)acrylate, trifluoromethyl (meth)acrylate, and 3[4[1-trifluoromethyl-2,2-bis[bis(trifluoromethyl)fluoromethyl]ethynyloxy]benzoxy]2-hydroxypropyl (meth)acrylate.

As the fluorine group-containing monomer, one type thereof may be solely used, and two or more types thereof may also be used in combination at any ratio.

The ratio of the fluorine group-containing monomer unit in the polymer forming the core portion is preferably equal to or higher than 0.1% by weight and more preferably equal to or higher than 0.5% by weight, and preferably equal to or lower than 20% by weight and more preferably equal to or lower than 15% by weight. By setting the ratio of the fluorine group-containing monomer unit to be equal to or higher than the lower limit of the above-mentioned range, the ion conductivity of the particulate polymer can be increased. By setting the ratio of the fluorine group-containing monomer unit to be equal to or lower than the upper limit, the strength of the core portion in the electrolytic solution is increased and the adhesion strength of the particulate polymer can be increased.

Moreover, the polymer forming the core portion of the particulate polymer may contain an acid group-containing monomer unit. The acid group-containing monomer unit is a structural unit having a structure that is formed by polymerization of a monomer containing an acid group. When the polymer forming the core portion contains the acid group-containing monomer unit, use of the particulate polymer as the binder for the lithium ion secondary battery can bring about uniform dispersion of the binder, and the adhesiveness in the electrolytic solution and the battery properties can be exerted at a high level.

Examples of the acid group-containing monomer may include monomers having a carboxylic acid group, monomers having a sulfonic acid group, monomers having a phosphonic acid group, and monomers having a hydroxy group.

Examples of the monomer having a carboxylic acid group may include monocarboxylic acids and dicarboxylic acids. Examples of monocarboxylic acid may include acrylic acid, methacrylic acid, and crotonic acid. Examples of dicarboxylic acid may include maleic acid, fumaric acid, and itaconic acid.

Examples of the monomer having a sulfonic acid group may include vinylsulfonic acid, methylvinylsulfonic acid, (meth)allylsulfonic acid, (meth)acrylic acid-2-ethyl sulfonate, 2-acrylamide-2-methylpropanesulfonic acid, and 3-allyloxy-2-hydroxypropanesulfonic acid.

Examples of the monomer having a phosphonic acid group may include 2-(meth)acryloyloxyethyl phosphate, methyl-2-(meth)acryloyloxyethyl phosphate, and ethyl-(meth)acryloyloxyethyl phosphate.

Examples of the monomer having a hydroxy group may include 2-hydroxyethyl acrylate, 2-hydroxypropyl acrylate, 2-hydroxyethyl methacrylate, and 2-hydroxypropyl methacrylate.

Among them, the monomers having a carboxylic acid group are preferable. In particular, monocarboxylic acids are preferable and methacrylic acid is more preferable.

As the acid group-containing monomer, one type thereof may be solely used, and two or more types thereof may also be used in combination at any ratio.

The ratio of the acid group-containing monomer unit in the polymer forming the core portion is preferably equal to or higher than 0.1% by weight, more preferably equal to or higher than 2% by weight, and particularly preferably equal to or higher than 5 by weight, and preferably equal to or lower than 20% by weight, more preferably equal to or lower than 15% by weight, and particularly preferably equal to or lower than 10% by weight. By setting the ratio of the acid group-containing monomer unit to be equal to or higher than the lower limit of the above-mentioned range, use of the particulate polymer as the binder for the lithium ion secondary battery can bring about uniform dispersion of the binder, and the adhesiveness in the electrolytic solution and the battery properties can be exerted at a high level. By setting the ratio of the acid group-containing monomer unit to be equal to or lower than the upper limit, the high temperature cycle property can be enhanced.

The polymer forming the core portion of the particulate polymer may contain an optional structural unit other than the above-mentioned ones. Examples of the optional structural unit may include vinyl chloride-based monomers such as vinyl chloride and vinylidene chloride; vinyl acetate-based monomers such as vinyl acetate; aromatic vinyl monomers such as styrene, α-methyl styrene, styrenesulfonic acid, butoxystyrene, and vinylnaphthalene; vinylamine-based monomers such as vinylamine; vinylamide-based monomers such as N-vinylformamide and N-vinylacetamide; (meth)acrylic acid derivatives such as 2-hydroxyethyl methacrylate; (meth)acrylic acid monomers such as acrylamide and methacrylamide; unsaturated dicarboxylic acid monomers such as maleic acid, fumaric acid, and maleic anhydride; maleimide; maleimide derivatives such as phenylmaleimide; and dien-based monomers such as 1,3-butadiene and isoprene. One type thereof may be solely used, and two or more types thereof may also be used in combination at any ratio.

The glass transition temperature of the polymer forming the core portion of the particulate polymer is preferably equal to or higher than 0° C., more preferably equal to or higher than 10° C., still more preferably equal to or higher than 20° C., still much more preferably equal to or higher than 30° C., and particularly preferably equal to or higher than 60° C., and preferably equal to or lower than 150° C., more preferably equal to or lower than 130° C., still more preferably equal to or lower than 110° C., still much more preferably equal to or lower than 100° C., particularly preferably equal to or lower than 90° C., and the most preferably equal to or lower than 80° C. By setting the glass transition temperature of the polymer forming the core portion to be equal to or higher than the lower limit of the above-mentioned range, the adhesiveness of the particulate polymer in the electrolytic solution can be further increased. By setting the glass transition temperature of the polymer forming the core portion to be equal to or lower than the upper limit, the high temperature cycle property of the lithium ion secondary battery can be further enhanced. The glass transition temperature may be measured in accordance with JIS K7121.

It is preferable that the polymer forming the core portion of the particulate polymer swells with the electrolytic solution at a swelling degree in a specific range. The specific swelling degree is preferably equal to or higher than 5 times, more preferably equal to or higher than 6 times, and particularly preferably equal to or higher than 7 times, and preferably equal to or lower than 30 times, more preferably equal to or lower than 25 times, and particularly preferably equal to or lower than 20 times. By setting the swelling degree to be within the above-mentioned range, the low temperature reception property of the battery can be made preferable.

As the electrolytic solution for measuring the swelling degree of the polymer forming the core portion, the electrolytic solution that is the same as that used for measuring the ion conductivity may be used.

The swelling degree of the polymer forming the core portion may be specifically measured in the following manner.

First, a polymer forming the core portion of the particulate polymer is prepared. For example, a polymer obtained by performing the same processes as those that are performed for producing the core portion in the method for producing the particulate polymer is prepared.

Thereafter, a film is prepared with the prepared polymer. For example, when the polymer is solid, the polymer is dried at 25° C. for 48 hours, and then the polymer is shaped into a film form to prepare a film having a thickness of 0.5 mm. For example, when the polymer is a solution or a dispersion such as latex, the solution or the dispersion is placed into a petri dish made of polytetrafluoroethylene and is dried at 25° C. for 48 hours to prepare a film having a thickness of 0.5 mm.

The film thus prepared is cut into a 1 cm-square to obtain a test piece. The weight of the test piece is measured and is set to W0.

The test piece is immersed at 60° C. for 72 hours in the electrolytic solution and is then taken out of the electrolytic solution. The electrolytic solution on the surface of the taken-out test piece is wiped off and the weight W1 of the test piece after the immersion test is measured.

Using these weights W0 and W1, the swelling degree S (factor) is calculated by an equation $S=W1/W0$.

An example of a method for adjusting the swelling degree of the polymer forming the core portion may be appropriate selection of the type and the amount of the monomer for producing the polymer forming the core portion in consideration of the SP value of the electrolytic solution. In general, when the SP value of the polymer is close to the SP value of the electrolytic solution, the polymer tends to easily swell with the electrolytic solution. On the other hand, when the SP value of the polymer is apart from the SP value of the electrolytic solution, the polymer tends to resist swelling with the electrolytic solution.

The SP value means a solubility parameter.

The SP value may be calculated in accordance with a method described in Hansen Solubility Parameters A User's Handbook, 2nd Ed (CRCPress).

The SP value of an organic compound may be estimated based on the molecular structure of the organic compound. Specifically, the SP value may be calculated using simulation software that can calculate the SP value from an equation of SMILE (for example, "HSPiP" (http://www.hansen-solubility.com)). In the simulation software, the SP value is calculated based on the theory described in Hansen SOLUBILITY PARAMETERS A User's Handbook Second Edition, Charles M. Hansen.

The diameter of the core portion is preferably equal to or higher than 50%, more preferably equal to or higher than 60%, still more preferably equal to or higher than 70%, and particularly preferably equal to or higher than 80%, and preferably equal to or lower than 99%, more preferably equal to or lower than 98.5%, and particularly preferably equal to or lower than 98% with respect to the volume average particle diameter 100% of the particulate polymer. By setting the diameter of the core portion to be equal to or higher than the lower limit of the above-mentioned range, the ion conductivity can be increased. By setting the diameter of the core portion to be equal to or lower than the upper limit, the adhesiveness in the electrolytic solution can be increased.

The diameter of the core portion may be measured as the volume average particle diameter of the particle polymer that is obtained in a production process of the particulate polymer before the shell portion is formed. The particle polymer before the shell portion is formed is the particle polymer forming the core portion. The volume average particle diameter is a particle diameter when a cumulative volume calculated from a small-diameter side in a particle size distribution measured by a laser diffraction method reaches 50%.

(1.4.2. Shell Portion)

It is preferable that the shell portion partially covers the outer surface of the core portion. That is, it is preferable that the shell portion covers the outer surface of the core portion but does not cover the entire outer surface of the core portion. Even in the case where the shell portion seems to completely cover the outer surface of the core portion in appearance, it is considered that the shell portion partially covers the outer surface of the core portion when a hole communicating between the inside and the outside of the shell portion is formed.

When the shell portion does not cover the entire outer surface of the core portion in this manner, ions in the electrolytic solution can easily enter the core portion of the particulate polymer. Therefore, when the core portion has high ion conductivity, the high ion conductivity can be utilized effectively.

The polymer forming the shell portion of the particulate polymer preferably contains an aromatic vinyl monomer unit. The aromatic vinyl monomer unit is a structural unit having a structure that is formed by polymerization of an aromatic vinyl monomer. When the polymer forming the shell portion contains the aromatic vinyl monomer unit, the particulate polymer can exert high adhesiveness when immersed in the electrolytic solution.

Examples of the aromatic vinyl monomer may include styrene, α-methylstyrene, styrenesulfonic acid, butoxystyrene, and vinylnaphthalene. Among them, styrene and styrene derivatives such as styrenesulfonic acid are more preferable. One type thereof may be solely used, and two or more types thereof may also be used in combination at any ratio.

The ratio of the aromatic vinyl monomer unit in the polymer forming the shell portion is preferably equal to or higher than 20% by weight, more preferably equal to or higher than 40% by weight, still more preferably equal to or higher than 50% by weight, still much more preferably equal to or higher than 60% by weight, and particularly preferably equal to or higher than 80% by weight, and preferably equal to or lower than 100% by weight, more preferably equal to or lower than 99.5% by weight, and still more preferably equal to or lower than 99% by weight. By setting the ratio of the aromatic vinyl monomer unit in the polymer forming the shell portion to be within the above-mentioned range, the particulate polymer can exert high adhesiveness when immersed in the electrolytic solution.

The polymer forming the shell portion of the particulate polymer may contain an acid group-containing monomer unit. Examples of the acid group-containing monomer may be the same as those as exemplified in the description of the particulate polymer. As the acid group-containing monomer, one type thereof may be solely used, and two or more types thereof may also be used in combination at any ratio.

The ratio of the acid group-containing monomer unit in the polymer forming the shell portion is preferably equal to or higher than 0.1% by weight, more preferably equal to or higher than 1% by weight, still more preferably equal to or higher than 3% by weight, and preferably equal to or lower than 20% by weight, more preferably equal to or lower than 10% by weight, and still more preferably equal to or lower than 7% by weight. By setting the ratio of the acid group-containing monomer unit to be within the above-mentioned range, dispersibility of the particulate polymer can be improved and preferable adhesiveness can be exerted over the entire surface of the adhesive layer containing the particulate polymer.

Furthermore, the polymer forming the shell portion of the particulate polymer may contain a crosslinkable monomer unit. Examples of the crosslinkable monomer may be the same as those as exemplified as the crosslinkable monomers that may be used for the polymer forming the core portion. As the crosslinkable monomer, one type thereof may be solely used, and two or more types thereof may also be used in combination at any ratio.

The ratio of the crosslinkable monomer unit in the polymer forming the shell portion is preferably equal to or higher than 0.1% by weight, more preferably equal to or higher than 0.2% by weight, and particularly preferably equal to or higher than 0.5% by weight, and preferably equal to or lower than 5% by weight, more preferably equal to or lower than 4% by weight, and particularly preferably equal to or lower than 3% by weight. By setting the ratio of the crosslinkable monomer unit to be equal to or higher than the lower limit, the adhesiveness of the particulate polymer in the electrolytic solution can be increased. By setting the ratio of the crosslinkable monomer unit to be equal to or lower than the upper limit, the high temperature cycle property of the secondary battery can be improved and the lifetime thereof can be therefore extended.

The polymer forming the shell portion of the particulate polymer may contain an optional structural unit other than the above-mentioned ones. Examples of the optional structural unit may include structural units as described as those that the polymer forming the core portion may contain. As the optional structural unit, one type thereof may be solely used, and two or more types thereof may also be used in combination at any ratio.

The glass transition temperature of the polymer forming the shell portion is preferably equal to or higher than 50° C., more preferably equal to or higher than 60° C., and particularly preferably equal to or higher than 70° C., and preferably equal to or lower than 200° C., more preferably equal to or lower than 180° C., still more preferably equal to or lower than 150° C., and particularly preferably equal to or lower than 120° C. By setting the glass transition temperature of the polymer forming the shell portion to be equal to or higher than the lower limit of the above-mentioned range, blocking of members containing the particulate polymer, such as the adhesive layer, the porous membrane, and the electrode active material layer, can be better prevented, and the low temperature output property of the lithium ion secondary battery can be further improved. By setting the glass transition temperature to be equal to or lower than the upper limit, the adhesiveness of the particulate polymer in the electrolytic solution can be further increased.

The polymer forming the shell portion preferably has a specific swelling degree with the electrolytic solution that is lower than the swelling degree of the polymer forming the core portion. Specifically, the swelling degree with the electrolytic solution of the polymer forming the shell portion is preferably higher than 1 time, more preferably equal to or higher than 1.1 times, and particularly preferably equal to or higher than 1.2 times, and preferably equal to or lower than 4 times, more preferably equal to or lower than 3.5 times, and particularly preferably equal to or lower than 3 times. When the polymer forming the shell portion has the swelling degree within the above-mentioned range, the shell portion exerts the adhesiveness in a state where the particulate polymer is immersed in the electrolytic solution but does not exert the adhesiveness in a state where the particulate polymer is dried usually. For example, blocking of the members containing the particulate polymer, such as the adhesive layer, the porous membrane, and the electrode active material layer, can be therefore prevented usually.

As the electrolytic solution that is used for measuring the swelling degree of the polymer forming the shell portion, the electrolytic solution that is the same as that used for measuring the ion conductivity is used.

Specifically, the swelling degree of the polymer forming the shell portion may be measured in the following manner.

First, a polymer forming the shell portion of the particulate polymer is prepared. For example, the polymer is produced in the same manner as the method for producing the core portion using a monomer composition that is used for producing the shell portion in place of a monomer composition that is used for producing the core portion in the method for producing the particulate polymer.

Thereafter, a film is prepared by the polymer forming the shell portion by the method that is the same as the method for measuring the swelling degree of the polymer forming the core portion. A test piece is obtained from the film and the swelling degree S is measured.

An example of a method for adjusting the swelling degree of the polymer forming the shell portion may be appropriate selection of the type and the amount of the monomer for producing the polymer forming the shell portion in consideration of the SP value of the electrolytic solution.

The average ratio of the outer surface of the core portion that is covered by the shell portion is preferably equal to or higher than 10%, more preferably equal to or higher than 30%, still more preferably equal to or higher than 40%, and particularly preferably equal to or higher than 60%, and preferably equal to or lower than 99.9%, more preferably equal to or lower than 98%, still more preferably equal to or lower than 95%, still much more preferably equal to or lower than 90%, and particularly preferably equal to or lower than 85%. By setting the average ratio of the outer surface of the core portion that is covered by the shell portion to be within the above-mentioned range, balance of the ion conductivity and the adhesiveness in the electrolytic solution can be made preferable.

The average ratio of the outer surface of the core portion that is covered by the shell portion may be measured based on an observation result of a cross-sectional structure of the particulate polymer. Specifically, the average ratio may be measured by the method described in the following.

First, the particulate polymer is sufficiently dispersed in a room temperature-curable epoxy resin, and then embedded to produce a block piece containing the particulate polymer. Then, the block piece is cut out into a thin piece having a thickness of 80 nm to 200 nm using a microtome with a diamond blade to prepare a measurement sample. Thereafter, dye treatment is performed on the measurement sample using, for example, ruthenium tetroxide or osmium tetraoxide if necessary.

Subsequently, the measurement sample is set to a transmission electron microscope (TEM) and the cross-sectional structure of the particulate polymer is photographed. The magnification of the electron microscope is preferably a magnification with which the cross section of one particulate polymer is within the field of view. Specifically, the magnification is preferably a factor of approximately 10000.

On the photographed cross-sectional structure of the particulate polymer, the length D1 of a circumference corresponding to the outer surface of the core portion and the length D2 of a portion on which the outer surface of the core portion and the shell portion abut against each other are measured. The ratio Rc of the outer surface of the core portion of the particulate polymer that is covered by the shell portion is calculated based on the following equation (1) using the measured lengths D1 and D2.

$$\text{Coverage } Rc\ (\%) = D2/D1 \times 100 \tag{1}$$

The above-mentioned coverage Rc is measured for equal to or more than 20 particulate polymers and an average value thereof is taken as the average ratio of the outer surface of the core portion of the particulate polymer that is covered by the shell portion.

The above-mentioned coverage Rc may be calculated manually from the cross-sectional structure and may also be calculated using commercially available image analysis software. For example, "AnalySIS Pro" (manufactured by Olympus Corporation) may be used as the commercially available image analysis software.

The shell portion preferably has an average thickness within a specific range with respect to the volume average particle diameter of the particulate polymer. Specifically, the average thickness of the shell portion with respect to the volume average particle diameter of the particulate polymer is preferably equal to or higher than 1%, more preferably equal to or higher than 1.5%, and particularly preferably equal to or higher than 2%, and preferably equal to or lower than 30%, more preferably equal to or lower than 25%, and particularly preferably equal to or lower than 20%. By setting the average thickness of the shell portion to be equal to or higher than the lower limit of the above-mentioned range, the low temperature output property of the lithium ion secondary battery can be further enhanced. By setting the average thickness to be equal to or lower than the upper limit, the adhesiveness of the particulate polymer in the electrolytic solution can be further increased.

The average thickness of the shell portion is calculated by observing the cross-sectional structure of the particulate polymer by the transmission electron microscopy (TEM). Specifically, the maximum thickness of the shell portion on the cross-sectional structure of the particulate polymer is measured. An average value of the maximum thicknesses of the shell portions of equal to or more than 20 particulate polymers that have been randomly selected is taken as the average thickness of the shell portion. When the shell portion is formed by particles of the polymer, and the particles forming the shell portion do not overlap with one another in the radial direction of the particulate polymer but the particles of the polymer do form the shell portion by a single layer, the number average particle diameter of the particles forming the shell portion is taken as the average thickness of the shell portion.

When the shell portion partially covers the outer surface of the core portion, it is preferable that the shell portion is formed by the particles of the polymer. When the shell portion is formed by the particles of the polymer, a plurality of particles forming the shell portion may overlap with one another in the radial direction of the particulate polymer. It is however preferable that the particles forming the shell portion do not overlap with one another in the radial direction of the particulate polymer and the particles of the polymer form the shell portion as a single layer.

The number average particle diameter of the particles forming the shell portion is preferably equal to or larger than 10 nm, more preferably equal to or larger than 20 nm, and particularly preferably equal to or larger than 30 nm, and preferably equal to or smaller than 200 nm, more preferably equal to or smaller than 150 nm, and particularly preferably equal to or smaller than 100 nm. By setting the number average particle diameter to be within the above-mentioned range, balance of the ion diffusion property and the adhesiveness of the adhesive layer in the electrolytic solution can be made preferable.

The number average particle diameter of the particles forming the shell portion may be measured by observing the cross-sectional structure of the particulate polymer by the transmission electron microscopy (TEM). Specifically, the maximum diameter of the particles forming the shell portion on the cross-sectional structure of the particulate polymer is measured. Then, an average value of the maximum diameters of the particles forming the shell portions of equal to or more than 20 particulate polymers that have been randomly selected is taken as the number average particle diameter of the particles forming the shell portion.

(1.4.3. Optional Components)

When the particulate polymer has the core-shell structure, the particulate polymer may include an optional component other than the aforementioned core portion and shell portion as long as the advantageous effects of the present invention are not significantly impaired.

For example, the core portion may include therein a portion formed by a polymer different from the core portion. As a specific example, seed particles used when the particulate polymer is produced by a seed polymerization method may remain in the core portion.

However, it is preferable that the particulate polymer includes only the core portion and the shell portion from the viewpoint of significantly exerting the advantageous effects of the present invention.

[1.5. Size of Particulate Polymer]

The volume average particle diameter of the particulate polymer is preferably equal to or larger than 0.01 μm, more preferably equal to or larger than 0.1 μm, and particularly preferably equal to or larger than 0.3 μm, and preferably equal to or smaller than 1 μm, more preferably equal to or smaller than 0.8 μm, and particularly preferably equal to or smaller than 0.6 μm. By setting the volume average particle diameter of the particulate polymer to be equal to or larger than the lower limit of the above-mentioned range, the dispersibility of the particulate polymer can be made preferable. By setting the volume average particle diameter of the particulate polymer to be equal to or smaller than the upper limit, the adhesiveness of the particulate polymer in the electrolytic solution can be increased.

[1.6. Method for Producing Particulate Polymer]

As the method for producing the particulate polymer, any method may be employed. For example, the particulate polymer having the core-shell structure may be produced by polymerizing the monomers of the polymer forming the core portion and the monomers of the polymer forming the shell portion in a stepwise manner while changing the ratio of the monomers over time. Specifically, the particulate polymer may be produced by a continuous multistage emulsion polymerization method or multistage suspension polymerization method in which the polymer at a subsequent stage coats the polymer at a previous stage in turn.

Hereinafter, an example of production of the particulate polymer having the core-shell structure by the multistage emulsion polymerization method will be described.

In the polymerization, an anionic surfactant such as sodium dodecylbenzenesulfonate and sodium dodecylsulfate, a nonionic surfactant such as polyoxyethylene nonyl phenyl ether and sorbitan monolaurate, or a catiotic surfactant such as octadecyl amine acetate may be used as an emulsifier in accordance with a prior art method. For example, peroxide such as t-butylperoxy-2-ethylhexanoate, potassium persulfate, and cumene peroxide or an azo compound such as 2,2'-azobis(2-methyl-N-(2-hydroxyethyl)-propionamide) and 2,2'-azobis(2-amidinopropane) hydrochloride may be used as a polymerization initiator.

As polymerization procedures, first, the monomers forming the core portion and the emulsifier are mixed in water as a solvent, and then the polymerization initiator is put into the mixture to perform emulsion polymerization, to thereby obtain a particle polymer forming the core portion. The polymerization of the monomers forming the shell portion may be further performed in the presence of the particle polymer forming the core portion, to thereby provide the particulate polymer having the core-shell structure.

In this case, it is preferable to supply the monomers for the polymer forming the shell portion to a polymerization system not at a time but in a divided manner by a plurality of number of times or continuously from the viewpoint of partial covering of the outer surface of the core portion by the shell portion. By supplying the monomers for the polymer forming the shell portion to the polymerization system in the divided manner or continuously, the polymer forming the shell portion is usually formed in a form of particles. The particles and the core portion bond to each other, to thereby form the shell portion partially covering the core portion.

When the monomers for the polymer forming the shell portion are supplied in the divided manner by a plurality of number of times, the particle diameter of the particles forming the shell portion and the average thickness of the shell portion can be controlled by the ratio at which the monomers are divided. When the monomers for the polymer forming the shell portion are supplied continuously, the particle diameter of the particles forming the shell portion and the average thickness of the shell portion can be controlled by adjusting a supply amount of the monomers per unit time.

When monomers having low affinity with the polymerization solvent are used as the monomers forming the polymer of the shell portion, use of such monomers elevates tendency of forming the shell portion that partially covers the core portion. When the polymerization solvent is water, the monomers forming the polymer of the shell portion preferably include a hydrophobic monomer and particularly preferably include an aromatic vinyl monomer.

Reduction of using amount of the emulsifier elevates tendency of forming the shell portion that partially covers the core portion. Thus the shell portion partially covering the core portion can be formed by appropriate adjustment of the amount of the emulsifier.

The volume average particle diameter of the particle polymer forming the core portion, the volume average particle diameter of the particulate polymer after the shell portion is formed, and the number average particle diameter of the particles forming the shell portion may be adjusted to be within desired ranges by adjusting the amount of the emulsifier, the amount of the monomers, and the like.

The average ratio of the outer surface of the core portion that is covered by the shell portion may be adjusted to be within a desired range by adjusting the amount of the emulsifier and the amount of the monomers for the polymer forming the shell portion, for example, in accordance with the volume average particle diameter of the particle polymer forming the core portion.

[1.7. Application of Particulate Polymer]

The particulate polymer of the present invention may be used as the binder for the lithium ion secondary battery.

For example, the particulate polymer of the present invention may be used as a binder for an adhesive layer of a lithium ion secondary battery. As a specific example thereof, the adhesive layer containing the particulate polymer of the present invention may be provided between a separator and an electrode plate so as to strongly bind the separator and the electrode plate in the electrolytic solution.

For example, the particulate polymer of the present invention may be used as a binder for a porous membrane of a lithium ion secondary battery. With this, the porous membrane can be strongly bound to the separator substrate or the electrode plate in the electrolytic solution. In this case, the porous membrane is a membrane containing non-conductive particles and the particulate polymer of the present invention.

Furthermore, for example, the particulate polymer of the present invention may be used as a binder for an electrode active material layer of a lithium ion secondary battery. With this, the electrode active material layer can be strongly bound to the current collector and the separator in the electrolytic solution. In this case, the electrode active material layer is a layer containing an electrode active material and the particulate polymer of the present invention.

In any of the above-mentioned cases, the battery properties such as the low temperature output property can be made preferable.

[2. Adhesive Layer]

The adhesive layer of the present invention is a layer that is provided between members in the lithium ion secondary battery for binding the members, and contains the particulate polymer of the present invention. The particulate polymer exerts high adhesiveness in the electrolytic solution of the lithium ion secondary battery. The adhesive layer of the present invention can therefore strongly bind the members to be bound. The lithium ion secondary battery including the adhesive layer of the present invention is excellent in the battery properties such as the low temperature output property

[2.1. Amount of Particulate Polymer in Adhesive Layer]

The ratio of the particulate polymer in the adhesive layer is preferably equal to or higher than 50% by weight, more preferably equal to or higher than 60% by weight, still more preferably equal to or higher than 70% by weight, and particularly preferably equal to or higher than 80% by weight, and preferably equal to or lower than 99.9% by weight, more preferably equal to or lower than 99% by weight, still more preferably equal to or lower than 98% by weight, and particularly preferably equal to or lower than 96% by weight. By setting the amount of the particulate polymer to be within the above-mentioned range, the adhesiveness of the adhesive layer in the electrolytic solution can be increased and the ion conductivity of the adhesive layer can be increased.

[2.2. Optional Binder for Adhesive Layer]

In addition to the particulate polymer, the adhesive layer may further contain an optional binder for an adhesive layer. Use of the binder for the adhesive layer can increase the mechanical strength of the adhesive layer. Furthermore, the binder for the adhesive layer can further improve the adhesiveness of the adhesive layer. Even when the particulate polymer does not exert the adhesiveness in a state where it does not swell with the electrolytic solution, the use of the binder for the adhesive layer can effecting binding of the particulate polymers, which enables easy formation of the adhesive layer.

As the binder for the adhesive layer, it is usually preferable to use a water-insoluble polymer. In particular, a thermoplastic elastomer such as a styrene-butadiene copolymer, a styrene-acrylonitrile copolymer, and a (meth) acrylic acid ester polymer is preferably used as the binder for the adhesive layer.

In particular, the (meth)acrylic acid ester polymer is preferably used as the binder for the adhesive layer. The (meth)acrylic acid ester polymer is a polymer containing a (meth)acrylic acid ester monomer unit. The (meth)acrylic acid ester polymer is preferable because it has high ion conductivity so as to improve rate property of the secondary battery and is stable electrochemically so as to improve the high temperature cycle property of the battery.

Examples of the (meth)acrylic acid ester monomer corresponding to the (meth)acrylic acid ester monomer unit may include alkyl acrylates such as methyl acrylate, ethyl acrylate, n-propylacrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One type thereof may be solely used, and two or more types thereof may also be used in combination at any ratio. Among them, n-butyl acrylate and 2-ethylhexyl acrylate are preferable because they are excellent in flexibility.

The ratio of the (meth)acrylic acid ester monomer unit in the polymer as the binder for the adhesive layer is preferably equal to or higher than 50% by weight, more preferably equal to or higher than 70% by weight, and particularly preferably equal to or higher than 90% by weight, and preferably equal to or lower than 99% by weight, more preferably equal to or lower than 98% by weight, and particularly preferably equal to or lower than 97% by weight. By setting the ratio of the (meth)acrylic acid ester monomer unit to be equal to or higher than the lower limit, the flexibility of the adhesive layer can be enhanced, thereby increasing the adhesiveness of the adhesive layer. By setting the ratio of the (meth)acrylic acid ester monomer unit to be equal to or lower than the upper limit, the rigidity of the adhesive layer can be enhanced, thereby also increasing the adhesiveness of the adhesive layer.

The polymer as the binder for the adhesive layer preferably contains an amide monomer unit. The amide monomer unit is a structural unit having a structure that is formed by polymerization of an amide monomer. The amide monomer is a monomer having an amide group and includes not only amide compounds but also imide compounds. When the polymer having an amide monomer unit is used as the binder for the adhesive layer, generation of gas upon charging and discharging can be reduced, thereby further improving the high temperature cycle property of the battery. The reason why use of the amide monomer unit can prevent generation of the gas is not clear but the following is assumed, although the present invention is not limited by the following assumption.

Repeated charging and discharging of the lithium ion secondary battery may cause generation of gas due to, for example, decomposition of the electrolytic solution and additives. It is considered that such a gas generation is due to halide ions contained in the secondary battery, and the halide ions cause decomposition of the electrolytic solution and a solid electrolyte interface (SEI) with the charging and discharging.

As for this disadvantage, the polymer containing the amide monomer unit can trap the halide ions in the electrolytic solution with the amide monomer unit. It is assumed that the generation of the gas due to the halide ions is thereby prevented.

Examples of the amide monomer may include carboxylic acid amide monomers, sulfonic acid amide monomers, and phosphoric acid amide monomers.

The carboxylic acid amide monomer is a monomer having an amide group bonded to a carboxylic acid group. Examples of the carboxylic acid amide monomer may include unsaturated carboxylic acid amide compounds such as (meth)acrylamide, α-chloroacrylamide, N,N'-methylene-bis-(meth)acrylamide, N,N'-ethylenebis(meth)acrylamide, N-hydroxymethyl(meth)acrylamide, N-2-hydroxyethyl(meth)acrylamide, N-2-hydroxypropyl(meth)acrylamide, N-3-hydroxypropyl(meth)acrylamide, crotonic acid amide, maleic acid diamide, fumaric acid diamide, and diacetone acrylamide; and N-aminoalkyl derivatives of unsaturated carboxylic acid amide, such as N-dimethylaminomethyl(meth)acrylamide, N-2-aminoethyl(meth)acrylamide, N-2-methylaminoethyl(meth)acrylamide, N-2-ethylaminoethyl(meth)acrylamide, N-2-dimethylaminoethyl(meth)acrylamide, N-2-diethylaminoethyl(meth)acrylamide, N-3-aminopropyl(meth)acrylamide, N-3-methylaminopropyl(meth)acrylamide, and N-3-dimethylaminopropyl(meth)acrylamide.

The sulfonic acid amide monomer is a monomer having an amide group bonded to a sulfonic acid group. Examples of the sulfonic acid amide monomer may include 2-acrylamide-2-methylpropane sulfonic acid and N-t-butyl acrylamide sulfonic acid.

The phosphoric acid amide monomer is a monomer having an amide group bonded to a phosphoric acid group. Examples of the phosphoric acid amide monomer may include acrylamide phosphoric acid and derivatives of acrylamide phosphoric acid.

Among these amide monomers, the carboxylic acid amide monomers are preferable, the unsaturated carboxylic acid amide compounds are more preferable, and (meth)acrylamide and N-hydroxymethyl(meth)acrylamide are particularly preferable.

As the amide monomer, one type thereof may be solely used, and two or more types thereof may also be used in combination at any ratio.

The ratio of the amide monomer unit in the polymer as the binder for the adhesive layer is preferably equal to or higher than 0.1% by weight, more preferably equal to or higher than 0.2% by weight, and particularly preferably equal to or higher than 0.5% by weight, and preferably equal to or lower than 20% by weight, more preferably equal to or lower than 15% by weight, and particularly preferably equal to or lower than 10% by weight. By setting the ratio of the amide monomer unit to be equal to or higher than the lower limit of the above-mentioned range, the generation of the gas in the lithium ion secondary battery can be prevented effectively and transition metal ions in the electrolytic solution can be trapped effectively. By setting the ratio of the amide monomer unit to be equal to or lower than the upper limit, the high temperature cycle property of the lithium ion secondary battery can be enhanced effectively.

The polymer as the binder for the adhesive layer may contain an acid group-containing monomer unit. Examples of the acid group-containing monomer unit may be the same as those as exemplified in the description of the particulate polymer. As the acid group-containing monomer unit, one type thereof may be solely used, and two or more types thereof may also be used in combination at any ratio.

The ratio of the acid group-containing monomer unit in the polymer as the binder for the adhesive layer is preferably equal to or higher than 0.2% by weight, more preferably equal to or higher than 0.4% by weight, particularly preferably equal to or higher than 0.6% by weight, and preferably equal to or lower than 10.0% by weight, more preferably equal to or lower than 6.0% by weight, and particularly preferably equal to or lower than 4.0% by weight. By setting the ratio of the acid group-containing monomer unit to be within the above-mentioned range, cohesion failure of the adhesive layer is prevented and the adhesive force of the adhesive layer can be improved.

Furthermore, the polymer as the binder for the adhesive layer may contain a (meth)acrylonitrile monomer unit. In this case, as the (meth)acrylonitrile monomer corresponding to the (meth)acrylonitrile monomer unit, acrylonitrile may be used, methacrylonitrile may be used, and acrylonitrile and methacrylonitrile may also be used in combination.

The ratio of the (meth)acrylonitrile monomer unit in the polymer as the binder for the adhesive layer is preferably equal to or higher than 0.2% by weight, more preferably equal to or higher than 0.5% by weight, and particularly preferably equal to or higher than 1.0% by weight, and preferably equal to or lower than 20.0% by weight, more preferably equal to or lower than 10.0% by weight, and particularly preferably equal to or lower than 5.0% by weight. By setting the ratio of the (meth)acrylonitrile monomer unit to be equal to or higher than the lower limit, the lifetime of the secondary battery can be particularly extended. By setting the ratio of the (meth)acrylonitrile monomer unit to be equal to or lower than the upper limit, the mechanical strength of the adhesive layer can be increased.

The polymer as the binder for the adhesive layer may contain a crosslinkable monomer unit. Examples of the crosslinkable monomer corresponding to the crosslinkable monomer unit may be the same as those as exemplified in the description of the particulate polymer. N-hydroxymethyl(meth)acrylamide as exemplified as the carboxylic acid amide monomer can function as both the amide monomer and the crosslinkable monomer, and N-hydroxymethyl (meth)acrylamide may be therefore used as the crosslinkable monomer as well. As the crosslinkable monomer, one type thereof may be solely used, and two or more types thereof may also be used in combination at any ratio.

The ratio of the crosslinkable monomer unit in the polymer as the binder for the adhesive layer is preferably equal to or higher than 0.2% by weight, more preferably equal to or higher than 0.6% by weight, and particularly preferably equal to or higher than 1.0% by weight, and preferably equal to or lower than 5.0% by weight, more preferably equal to or lower than 4.0% by weight, and particularly preferably equal to or lower than 3.0% by weight. By setting the ratio of the crosslinkable monomer unit to be equal to or higher than the lower limit, the mechanical strength of the adhesive layer can be increased. By setting the ratio of the crosslinkable monomer unit to be equal to or lower than the upper limit, a problem in that the adhesive layer is deteriorated in flexibility and gets brittle can be prevented.

Moreover, the polymer as the binder for the adhesive layer may contain an optional structural unit other than the above-mentioned structural units. For example, the polymer as the binder for the adhesive layer may contain a structural unit having a structure that is formed by polymerization of styrene (styrene unit), a structural unit having a structure that is formed by polymerization of butadiene (butadiene unit), and a structural unit having a structure that is formed by polymerization of acrylonitrile (acrylonitrile unit) in combination with the above-mentioned structural units. As the optional structural unit, one type thereof may be solely used, and two or more types thereof may also be used in combination at any ratio.

The glass transition temperature of the polymer as the binder for the adhesive layer is preferably equal to or higher than −100° C., more preferably equal to or higher than −90° C., and particularly preferably equal to or higher than −80° C., and preferably equal to or lower than 0° C., more preferably equal to or lower than −5° C., and particularly preferably equal to or lower than −10° C. By setting the glass transition temperature of the polymer as the binder for the adhesive layer to be equal to or higher than the lower limit of the above-mentioned range, the adhesiveness of the adhesive layer can be further increased. By setting the glass transition temperature of the polymer to be equal to or lower than the upper limit, the flexibility of the adhesive layer can be enhanced.

The binder for the adhesive layer may be in a form of particles, and may also be in a form of non-particles. It is preferable to use the particulate binder from the viewpoint of increase in the ion diffusion property with provision of fine pores in the adhesive layer.

When the binder for the adhesive layer is in a form of particles, the volume average particle diameter of the binder for the adhesive layer is preferably equal to or larger than 0.01 µm, more preferably equal to or larger than 0.02 µm, and particularly preferably equal to or larger than 0.05 µm, and preferably equal to or smaller than 1 µm, more preferably equal to or smaller than 0.9 µm, and particularly preferably equal to or smaller than 0.8 µm. By setting the volume average particle diameter of the binder for the adhesive layer to be equal to or larger than the lower limit of the above-mentioned range, the dispersibility of the binder for the adhesive layer can be increased. By setting the volume average particle diameter of the binder for the adhesive layer to be equal to or smaller than the upper limit, the adhesiveness of the adhesive layer can be increased.

Examples of a method for producing the binder for the adhesive layer may include a solution polymerization method, a suspension polymerization method, and an emulsion polymerization method. Among them, the emulsion polymerization method and the suspension polymerization method are preferable because polymerization can be effected in water and the product as it is can be used as a material for slurry for the adhesive layer. Furthermore, when the polymer as the binder for the adhesive layer is produced, it is preferable that the reaction system thereof contain a dispersant. The binder for the adhesive layer is usually formed of the polymer of which the binder substantially consists. However, the binder may be accompanied with an optional component such as an additive used for the polymerization.

The amount of the binder for the adhesive layer is preferably equal to or larger than 0.1 parts by weight and more preferably equal to or larger than 0.2 parts by weight, and preferably equal to or smaller than 30 parts by weight, and more preferably equal to or smaller than 20 parts by weight with respect to 100 parts by weight of the particulate polymer. By setting the amount of the binder for the adhesive layer to be equal to or larger than the lower limit of the above-mentioned range, the strength of the adhesive layer can be increased. By setting the amount of the binder for the adhesive layer to be equal to or smaller than the upper limit, high ion conductivity that the particulate polymer has can be sufficiently exerted.

[2.3. Optional Components]

The adhesive layer of the present invention may contain an optional component other than the aforementioned particulate polymer and binder for the adhesive layer. As the optional component, those that do not give an excessively non-preferable influence on battery reaction may be used. As the optional component, one type thereof may be solely used, and two or more types thereof may also be used in combination at any ratio.

For example, the adhesive layer may contain a water-soluble polymer such as carboxymethyl cellulose and salts thereof; a non-conductive fiber such as a cellulose fiber; non-conductive particles such as alumina; an isothiazoline compound; a chelate compound; a pyrithione compound; a dispersant; a leveling agent; an antioxidant; a thickener; a defoaming agent; a wetting agent; and an electrolyte additive having a function of inhibiting decomposition of the electrolyte solution.

[2.4. Amount and Thickness of Adhesive Layer]

The amount of the adhesive layer per unit area is preferably equal to or larger than 0.1 $g/m^2$ and preferably equal to or smaller than 1.5 $g/m^2$. By setting the amount of the adhesive layer per unit area to be equal to or larger than the lower limit of the above-mentioned range, the adhesiveness of the adhesive layer in the electrolytic solution can be increased. By setting the amount of the adhesive layer per unit area to be equal to or smaller than the upper limit, excessive increase in resistance by the adhesive layer and lowering of the high temperature cycle property can be prevented.

The thickness of the adhesive layer is preferably equal to or larger than 0.1 µm, more preferably equal to or larger than 0.2 µm, and particularly preferably equal to or larger than 0.5 µm, and preferably equal to or smaller than 5 µm, more preferably equal to or smaller than 4 µm, and particularly preferably equal to or smaller than 3 µm. By setting the thickness of the adhesive layer to be equal to or larger than the lower limit of the above-mentioned range, the adhesiveness of the adhesive layer in the electrolytic solution can be increased. By setting the thickness of the adhesive layer to be equal to or smaller than the upper limit, excessive increase in resistance by the adhesive layer and lowering of the high temperature cycle property can be prevented.

It is preferable that the adhesive layer has porosity. As the adhesive layer contains the particulate polymer, the adhesive layer tends to have pores formed therein. With the pores, the adhesive layer is excellent in ion diffusion property.

[2.5. Method for Producing Adhesive Layer]

The adhesive layer may be produced by preparing a slurry for the adhesive layer that contains components that are to be contained in the adhesive layer, coating an appropriate substrate with the slurry for the adhesive layer, and drying it if necessary. For example, the adhesive layer may be produced by a production method including a step of coating the substrate with the slurry for the adhesive layer to obtain a membrane of the slurry for the adhesive layer, and an optional step of removing a solvent such as water from the membrane by drying.

The slurry for the adhesive layer contains the particulate polymer, and may optionally contain the binder for the adhesive layer and the optional component. Furthermore, the slurry for the adhesive layer usually contains a solvent. Water is preferably used as the solvent. The particulate polymer and the binder for the adhesive layer are usually water-insoluble. When water is used as the solvent, the particulate polymer and the binder for the adhesive layer disperse in forms of particles in water.

A solvent other than water and water may also be used in combination as the solvent. Examples of the solvent that may be used in combination with water may include cyclic aliphatic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One type thereof may be solely used, and two or more types thereof may also be used in combination at any ratio. However, it is preferable to solely use water as the solvent.

The amount of the solvent in the slurry for the adhesive layer is preferably set such that a solid content concentration of the slurry for the adhesive layer is within a desired range. The specific solid content concentration of the slurry for the adhesive layer is preferably equal to or higher than 10% by weight, more preferably equal to or higher than 15% by weight, and particularly preferably equal to or higher than 20% by weight, and preferably equal to or lower than 80% by weight, more preferably equal to or lower than 75% by weight, and particularly preferably equal to or lower than 70% by weight. The solid content of a certain composition means a material that remains after the composition is dried.

The slurry for the adhesive layer may be produced by mixing the above-mentioned components. There is no particular limitation on mixing order of the components. Furthermore, a mixing method is not either particularly limited. In order to quickly disperse the particles, a disperser is usually used as a mixing device for mixing.

It is preferable that the disperser is a device capable of uniformly dispersing and mixing the above-mentioned components. Examples thereof may include a ball mill, a sand mill, a pigment disperser, a grinding machine, an ultrasonic disperser, a homogenizer, and a planetary mixer. In particular, high dispersion devices such as a bead mill, a roll mill, and FILMIX are preferable because they can apply high dispersion shear.

Examples of the method for application of the slurry for the adhesive layer may include a doctor blade method, a dip coating method, a reverse roll method, a direct roll method, a spray coat method, a gravure method, an extrusion method, and a brush coating method.

Examples of a drying method may include drying with the air such as hot air, warm air, and low humid air; vacuum drying; and drying methods by irradiation with energy rays such as infrared rays, far-infrared rays, and electron beams. The specific drying method is preferably selected based on a type of the solvent that is used.

In the method for producing the adhesive layer, an optional operation other than the above-mentioned ones may be performed.

For example, heat treatment may be performed. The heat treatment can form crosslink of a thermally crosslinkable group contained in the polymer component.

[2.6. Application of Adhesive Layer]

The adhesive layer of the present invention may be used for effecting adhesion of the members constituting the lithium ion secondary battery. In particular, the adhesive layer is preferably used for effecting adhesion between the separator and the electrode. In this case, although the adhesive layer may be used for effecting adhesion of a separator formed of a separator substrate and the electrode, the adhesive layer is preferably used for effecting adhesion of a porous membrane and the electrode in the lithium ion secondary battery including a separator having a separator substrate and the porous membrane and the electrode.

[3. Porous Membrane Composition]

The porous membrane composition of the present invention is a composition containing non-conductive particles and the particulate polymer of the present invention. Using the porous membrane composition, a porous membrane may be produced. As the particulate polymer of the present invention exerts high adhesiveness in the lithium ion secondary battery, the porous membrane that is produced using the porous membrane composition of the present invention exerts high adhesiveness to the members such as the electrode plate and the separator substrate. Further, the lithium ion secondary battery including the porous membrane is excellent in the battery properties such as the low temperature output property.

[3.1. Non-Conductive Particles]

As described above, the porous membrane composition contains the non-conductive particles. As the porous membrane contains the non-conductive particles, insulating property of the porous membrane can be enhanced and short circuit in the lithium ion secondary battery can be prevented more stably. The non-conductive particles usually has high rigidity, whereby the mechanical strength of the porous membrane can be enhanced. When the porous membrane is provided on the separator, even if contracting stress is generated on the separator substrate by heat, the porous membrane can act against the stress. Thus, the porous membrane can prevent the short circuit due to the contraction of the separator substrate.

As the non-conductive particles, inorganic particles may be used and organic particles may also be used. As the non-conductive particles, one type thereof may be solely used, and two or more types thereof may also be used in combination at any ratio.

The inorganic particles are usually excellent in dispersion stability in water, have low tendency to cause precipitation in the porous membrane composition, and can thus maintain a uniform slurry state for a long period of time. Furthermore, use of the inorganic particles can usually increase thermal resistance of the porous membrane.

As the material of the non-conductive particles, materials having electrochemical stability are preferable. Examples of the inorganic material for the non-conductive particles that is preferable from such a viewpoint may include particles of oxides such as aluminum oxide (alumina), aluminum oxide hydrates (boehmite (AlOOH), Gibbsite (Al(OH)$_3$)), silicon oxide, magnesium oxide (magnesia), magnesium hydroxide, calcium oxide, titanium oxide (titania), BaTiO$_3$, ZrO$_2$, and alumina-silica complex oxide; nitride particles such as aluminum nitride and boron nitride; particles of covalent crystals such as silicon and diamond; particles of ionic crystals having low solubility, such as barium sulfate, calcium fluoride, and barium fluoride; and microparticles of clays such as talc and montmorillonite.

Among them, the particles of oxides are preferable from the viewpoint of stability in the electrolytic solution and electropotential stability. In particular, titanium oxide, aluminum oxide, aluminum oxide hydrate, magnesium oxide, and magnesium hydroxide are more preferable from the viewpoint of low water-absorbing property and excellent thermal resistance. Aluminum oxide, aluminum oxide hydrate, magnesium oxide, and magnesium hydroxide are more preferable, and aluminum oxide is particularly preferable. The thermal resistance is resistance to high temperature of, for example, equal to or higher than 180° C.

As the organic particles, polymer particles are usually used. When the organic particles are employed, their affinity with water can be controlled by adjusting a type and an amount of a functional group on the surface of the organic particles, whereby it is possible to control a moisture amount contained in the porous membrane. Furthermore, the organic particles are usually excellent in less dissolution of metal ions.

As the polymer forming the non-conductive particles, a polymer other than the above-mentioned particulate polymer may be used. Examples thereof may include a variety of polymer compounds such as polystyrene, polyethylene, melamine resin, and phenol resin. The polymer compound forming the particles may be a mixture, a modified body, a derivative, a random copolymer, an alternating copolymer, a graft copolymer, a block copolymer, a crosslinked body, or the like for use. The organic particles may be formed by a mixture of polymer compounds of equal to or more than two types.

When the organic particles are used as the non-conductive particles, they may not have the glass transition temperature. When the material forming the organic particles has the glass transition temperature, the glass transition temperature is usually equal to or higher than 150° C., preferably equal to or higher than 200° C., and more preferably equal to or higher than 250° C., and usually equal to or lower than 500° C.

If necessary, the non-conductive particles may be subject to element substitution, surface treatment, solid solution formation, or the like. One non-conductive particle may solely contain therein one type of the above-mentioned materials or may contain therein equal to or more than two types of the above-mentioned materials in combination at any ratio. In addition, the non-conductive particles may be a combination of two or more types of particles formed of different materials.

Examples of the shape of the non-conductive particles may include a spherical shape, an oval spherical shape, a polygonal shape, a tetrapod (registered trademark) shape, a plate shape, and a scaly shape. Among them, the tetrapod (registered trademark) shape, the plate shape, and the scaly shape are preferable from the viewpoint of increasing a void ratio of the porous membrane to suppress lowering of the ion conductivity by the porous membrane.

The volume average particle diameter of the non-conductive particles is preferably equal to or larger than 0.01 µm, more preferably equal to or larger than 0.05 µm, and particularly preferably equal to or larger than 0.1 µm, and preferably equal to or smaller than 20 µm, more preferably equal to or smaller than 15 µm, and particularly preferably equal to or smaller than 10 µm. By setting the volume average particle diameter of the non-conductive particles to be equal to or larger than the lower limit of the above-mentioned range, permeability of the electrolytic solution can be enhanced. By setting the volume average particle diameter of the non-conductive particles to be equal to or smaller than the upper limit, the thickness of the porous membrane can be reduced.

The BET specific surface area of the non-conductive particles is preferably equal to or larger than 0.9 m$^2$/g and more preferably equal to or larger than 1.5 m$^2$/g, for example. For preventing aggregation of the non-conductive particles and obtaining preferable flowability of the porous membrane composition, it is preferable that the BET specific surface area is not too large. For example, the BET specific surface area is preferably equal to or smaller than 150 m$^2$/g.

The amount of the non-conductive particles in the porous membrane is preferably equal to or higher than 70% by weight and more preferably equal to or higher than 80% by weight, and preferably equal to or lower than 97% by weight and more preferably equal to or lower than 95% by weight. By setting the amount of the non-conductive particles to be within the above-mentioned range, voids between the non-conductive particles can be formed to some extent that migration of ions are not inhibited while ensuring contact portions of the non-conductive particles therebetween. Accordingly, by setting the amount of non-conductive particles to be within the above-mentioned range, the strength of the porous membrane can be improved so as to prevent short circuit of the secondary battery stably.

[3.2. Amount of Particulate Polymer in Porous Membrane Composition]

In the porous membrane composition, the amount of the particulate polymer is preferably equal to or larger than 0.1 parts by weight and more preferably equal to or larger than 0.2 parts by weight, and preferably equal to or smaller than 30 parts by weight and more preferably equal to or smaller than 20 parts by weight with respect to 100 parts by weight of the non-conductive particles. By setting the amount of the particulate polymer to be equal to or larger than the lower limit of the above-mentioned range, the non-conductive particles can be held in the porous membrane stably. Furthermore, binding force between the porous membrane and the separator substrate or the electrode plate can be increased and the ion conductivity of the porous membrane can be increased. By setting the amount of the particulate polymer to be equal to or smaller than the upper limit, the lifetime of the lithium ion secondary battery can be extended.

[3.3. Binder for Porous Membrane]

The porous membrane composition may further contain an optional binder for the porous membrane in addition to the non-conductive particles and the particulate polymer. With use of the binder for the porous membrane, not only the adhesiveness of the particulate polymer but also the adhesiveness of the binder for the porous membrane can be utilized. The mechanical strength of the porous membrane can be therefore increased. In addition, the adhesiveness between the porous membrane and the separator substrate or the electrode plate can be increased.

As the binder for the porous membrane, for example, the binder that is selected from the same range as described as the binder for the adhesive layer can be used. In particular, use of the polymer containing the amide monomer unit can further improve the high temperature cycle property of the lithium ion secondary battery and it is therefore used preferably. As the binder for the porous membrane, one type thereof may be solely used, and two or more types thereof may also be used in combination at any ratio.

The amount of the binder for the porous membrane is preferably equal to or larger than 0.1 parts by weight and more preferably equal to or larger than 0.2 parts by weight, and preferably equal to or smaller than 30 parts by weight and more preferably equal to or smaller than 20 parts by weight with respect to 100 parts by weight of the non-conductive particles. By setting the amount of the binder for the porous membrane to be equal to or larger than the lower limit of the above-mentioned range, the adhesiveness between the porous membrane and the separator substrate or the electrode plate can be increased. By setting the amount of the binder for the porous membrane to be equal to or smaller than the upper limit, the lifetime of the lithium ion secondary battery can be extended.

[3.4. Water-Soluble Polymer]

The porous membrane composition may further contain a water-soluble polymer. The water-soluble polymer in the porous membrane composition usually functions as a viscosity modifier. In particular, when the porous membrane composition contains water as a solvent, a part of the water-soluble polymer is usually dissolved in the solvent in the porous membrane composition whereas another part of the water-soluble polymer is usually adsorbed onto the surfaces of the particles such as the non-conductive particles. As a result, the surfaces of the particles are coated with a layer of the water-soluble polymer to thereby improve the dispersibility of the particles in water. Furthermore, the water-soluble polymer also has a function of effecting adhesion of the non-conductive particles.

Examples of the water-soluble polymer may include cellulose polymers such as carboxymethyl cellulose, methyl cellulose, and hydroxypropyl cellulose, and ammonium salts and alkali metal salts thereof; (modified) poly(meth)acrylic acid, and ammonium salts and alkali metal salts thereof; polyvinyl alcohol compounds such as (modified) polyvinyl alcohol, a copolymer of acrylic acid or acrylic acid salt and vinyl alcohol, and a copolymer of maleic anhydride, maleic acid, or fumaric acid and vinyl alcohol; and polyethylene glycol, polyethylene oxide, polyvinyl pyrrolidone, modified polyacrylic acid, oxide starch, phosphoric acid starch, casein, and a variety of modified starch. The "(modified) poly" means "unmodified poly" and "modified poly". One type thereof may be solely used, and two or more types thereof may also be used in combination at any ratio.

The amount of the water-soluble polymer is preferably equal to or larger than 0.1 parts by weight and more preferably equal to or larger than 0.2 parts by weight, and preferably equal to or smaller than 10 parts by weight and more preferably equal to or smaller than 5 parts by weight with respect to 100 parts by weight of the non-conductive particles. By setting the amount of the water-soluble polymer to be equal to or larger than the lower limit of the above-mentioned range, the adhesiveness of the porous membrane can be improved. By setting the amount of the water-soluble polymer to be equal to or smaller than the upper limit, the lifetime of the lithium ion secondary battery can be extended.

[3.5. Solvent]

The porous membrane composition usually contains a solvent. Water is preferably used as the solvent. The non-conductive particles and the particulate polymer are usually water-insoluble. When water is used as the solvent, the non-conductive particles and the particulate polymer disperse in water in a form of particles.

A solvent other than water and water may also be used in combination as the solvent. For example, as the solvent that may be used in combination with water, a solvent optionally selected from the range as exemplified as the solvent of the slurry for the adhesive layer may be used. As the solvent, one type thereof may be solely used, and two or more types thereof may also be used in combination at any ratio. However, it is preferable to solely use water as the solvent.

The amount of the solvent in the porous membrane composition is preferably set such that a solid content concentration of the porous membrane composition is within a desired range. The specific solid content concentration of the porous membrane composition is preferably equal to or higher than 10% by weight, more preferably equal to or higher than 15% by weight, and particularly preferably equal to or higher than 20% by weight, and preferably equal to or lower than 80% by weight, more preferably equal to or lower than 75% by weight, and particularly preferably equal to or lower than 70% by weight.

[3.6. Optional Components]

The porous membrane composition may contain an optional component other than the aforementioned non-conductive particles, particulate polymer, binder for the porous membrane, water-soluble polymer, and solvent. As the optional component, those that do not give an excessively non-preferable influence on battery reaction may be used. As the optional component, one type thereof may be solely used, and two or more types thereof may also be used in combination at any ratio.

For example, the porous membrane composition may contain an isothiazoline compound, a chelate compound, a pyrithione compound, a dispersant, a leveling agent, an antioxidant, a thickener, a defoaming agent, a wetting agent, and an electrolyte additive having a function of inhibiting decomposition of the electrolyte solution.

[3.7. Properties of Porous Membrane Composition]

The porous membrane composition is usually a fluid slurry composition. Further, in the porous membrane composition, the components contained in the porous membrane composition have high dispersibility. Therefore, the viscosity of the porous membrane composition can usually be lowered easily. Specific viscosity of the porous membrane composition is preferably 10 mPa·s to 2000 mPa·s from the viewpoint of providing good coating property during production of the porous membrane. The above-mentioned viscosity is a value measured using an E-type viscometer at 25° C. and a rotation speed of 60 rpm.

[3.8. Method for Producing Porous Membrane Composition]

The method for producing the porous membrane composition is not particularly limited. The porous membrane composition is usually produced by mixing the above-mentioned components.

There is no particular limitation on mixing order of the components. Furthermore, the mixing method is not either particularly limited. In order to quickly disperse the particles, a disperser is usually used as a mixing device for mixing.

It is preferable that the disperser is a device capable of uniformly dispersing and mixing the above-mentioned components. Examples thereof may include a ball mill, a sand mill, a pigment disperser, a grinding machine, an ultrasonic disperser, a homogenizer, and a planetary mixer. In particular, high dispersion devices such as a bead mill, a roll mill, and FILMIX are preferable because they can apply high dispersion shear.

[3.9. Method for Producing Porous Membrane]

The porous membrane for the lithium ion secondary battery may be produced as a membrane formed of a solid content of the porous membrane composition by coating an appropriate substrate with the porous membrane composition and drying it if necessary. For example, the porous membrane may be produced by a production method including a step of coating the substrate with the porous membrane composition to obtain a membrane of the porous membrane composition, and an optional step of removing a solvent such as water from the membrane by drying.

The porous membrane thus obtained contains the non-conductive particles and voids between the non-conductive particles configure fine pores of the porous membrane. Further, these non-conductive particles are bonded by the particulate polymer. As the particulate polymer has high adhesiveness in the electrolytic solution, the porous membrane can be strongly bounded to the separator substrate or the electrode plate in the electrolytic solution. Further, as the particulate polymer has high ion conductivity, increase in resistance caused by the porous membrane is suppressed at a low level. When the porous membrane is provided on the separator, contraction of the separator substrate by heat can be prevented and damage of the separator substrate due to foreign matters can be prevented. When the porous membrane is provided on the electrode, the porous membrane can prevent detachment of particles of the electrode active material or the like from the electrode active material layer and removal of the electrode active material layer from the current collector.

The substrate is a member that acts as a subject on which a membrane of the porous membrane composition is formed. There is no limitation on the substrate. For example, the membrane of the porous membrane composition may be formed on the surface of a release film. From the membrane, the solvent may be removed to form the porous membrane. The porous membrane may then be removed from the release film. However, from the viewpoint of increasing production efficiency by omitting the step of releasing the porous membrane, a component of the battery is usually used as the substrate. Examples of the component of the battery may include the separator substrate and the electrode plate.

Examples of the coating method may include a doctor blade method, a dipping method, a reverse roll method, a direct roll method, a gravure method, an extrusion method, and a brush coating method. Among them, the dipping method and the gravure method are preferable because thereby a uniform porous membrane can be obtained.

Examples of the drying method may include drying with the air such as hot air, warm air, and low humid air; vacuum drying; and drying methods by irradiation with infrared rays, far-infrared rays, and electron beams.

In the method for producing the porous membrane, an optional operation other than the above-mentioned ones may be performed.

For example, pressure treatment may be performed on the porous membrane by a press method such as mold press and roll press. The adhesiveness between the substrate and the porous membrane in the electrolytic solution can be improved by performing the pressure treatment. For keeping the void ratio of the porous membrane in a preferable range, it is preferable to appropriately control pressure and pressing time such that they are not excessively increased.

In order to remove remaining water, the porous membrane is preferably dried by vacuum drying or in a dry room, for example.

For example, heat treatment is also preferably performed. With the heat treatment, the thermally crosslinkable group contained in the polymer component can be crosslinked so as to increase the adhesive force.

The thickness of the porous membrane is preferably equal to or larger than 0.1 µm, more preferably equal to or larger than 0.2 µm, and particularly preferably equal to or larger than 0.3 µm, and preferably equal to or smaller than 20 µm, more preferably equal to or smaller than 15 µm, and particularly preferably equal to or smaller than 10 µm. By setting the thickness of the porous membrane to be equal to or larger than the lower limit of the above-mentioned range, the thermal resistance of the porous membrane can be enhanced. By setting the thickness of the porous membrane to be equal to or smaller than the upper limit, lowering of the ion conductivity due to the porous membrane can be prevented.

The porous membrane thus produced may be provided on the separator or the electrode, for example.

[4. Separator]

The separator is a member that is provided between the positive electrode and the negative electrode in order to prevent short circuit, and includes a separator substrate. It is preferable that the porous membrane containing the particulate polymer is provided on the separator substrate, and that the adhesive layer containing the particulate polymer is provided thereon. Specific examples of the preferable configuration of the separator are as follows.

(i) A separator including the separator substrate and the porous membrane containing the particulate polymer.

(ii) A separator including the separator substrate, the porous membrane containing the particulate polymer, and the adhesive layer containing the particulate polymer in this order.

(iii) A separator including the separator substrate, the porous membrane containing the particulate polymer, and the adhesive layer containing no particulate polymer.

(iv) A separator including the separator substrate, the porous membrane containing no particulate polymer, and the adhesive layer containing the particulate polymer.

(v) A separator including the separator substrate, and the adhesive layer containing the particulate polymer.

By including the porous membrane or the adhesive layer containing the particulate polymer of the present invention in the aforementioned manner, the separator can be bound to other components with high adhesive force in the lithium ion secondary battery. Further, by providing the porous membrane or the adhesive layer containing the particulate polymer of the present invention, the ion conductivity of the separator can be increased. Consequently, favorable battery properties such as the low temperature output property of the lithium ion secondary battery can be obtained.

[4.1. Separator Substrate]

As the separator substrate, for example, a porous substrate having micropores may be used. Use of such a separator substrate can prevent short circuit without inhibiting the charging and discharging of the battery in the secondary battery. In particular, it is preferable to use a porous substrate made of an organic material as the separator substrate. When an inner temperature of the battery is increased, the porous substrate made of the organic material melts to close the micropores. Consequently, the porous substrate can inhibit the migration of the lithium ions so as to shield electric current, thereby enhancing the safety of the lithium ion secondary battery.

Examples of the separator substrate may include porous substrates made of resin containing polyolefin (for example, polyethylene, polypropylene, polybutene, and polyvinyl chloride), a mixture thereof, or a copolymer thereof; porous substrates made of resin containing polyethylene terephthalate, polycycloolefin, polyethersulfone, polyamide, polyimide, polyimideamide, polyaramide, nylon, polytetrafluoroethylene, and cellulose; woven products formed by weaving fibers of the above-mentioned resins; nonwoven fabrics of the fibers of the above-mentioned resins; and aggregates of insulating material particles. Furthermore, a multilayer body of a multilayer structure including any combination of two or more of these layers may also be used as the separator substrate.

The thickness of the separator substrate is preferably equal to or larger than 0.5 μm and more preferably equal to or larger than 1 μm, and preferably equal to or smaller than 40 μm, more preferably equal to or smaller than 30 μm, and particularly preferably equal to or smaller than 10 μm. When the thickness of the separator substrate is within the above-mentioned range, increase in resistance by the separator substrate in the secondary battery is reduced and operability at the time of production of the battery is excellent.

[4.2. Porous Membrane Included in Separator]

The porous membrane may be provided on the surface of the separator substrate. The porous membrane may be provided on only one surface of the separator substrate or may be provided on both surfaces thereof. The porous membrane preferably contains the particulate polymer of the present invention. Such a separator may be produced by performing the above-mentioned method for producing the porous membrane using the separator substrate as the substrate, for example.

When the separator includes the adhesive layer containing the particulate polymer of the present invention, the porous membrane may not contain the particulate polymer of the present invention and the separator may not contain the porous membrane.

[4.3. Adhesive Layer Included in Separator]

The adhesive layer may be provided on the separator substrate directly or via an optional layer such as the porous membrane. The adhesive layer may be provided on only one surface of the separator substrate or may be provided on both surfaces thereof. The adhesive layer preferably contains the particulate polymer of the present invention. Such a separator may be produced by forming the adhesive layer on a substrate by the above-mentioned method for producing the adhesive layer using, as the substrate, the separator substrate or the multilayer body including the separator substrate and an optional layer.

When the separator includes the porous membrane containing the particulate polymer of the present invention, the adhesive layer may not contain the particulate polymer of the present invention and the separator may not contain the adhesive layer.

[5. Electrode]

The porous membrane produced using the porous membrane composition of the present invention may also be provided on an electrode. In this case, the electrode includes an electrode plate and the porous membrane. The electrode plate usually includes a current collector and an electrode active material layer. When the electrode includes the porous membrane, short circuit of the battery can be prevented so as to enhance the safety. When the porous membrane included in the battery contains the particulate polymer, the adhesiveness of the porous membrane in the electrolytic solution is improved, thereby improving the adhesiveness between the electrode plate and the porous membrane in the electrolytic solution. Furthermore, as the porous membrane containing the particulate polymer of the present invention has high ion conductivity, the battery properties such as the low temperature output property can be therefore made preferable.

[5.1. Current Collector]

As the current collector, a material having electroconductivity and electrochemical durability may be used. As the material of the current collector, a metal material is usually used. Examples thereof may include iron, copper, aluminum, nickel, stainless steel, titanium, tantalum, gold, and platinum. Among them, aluminum is preferable for the current collector that is used for the positive electrode and copper is preferable for the current collector that is used for the negative electrode. As the material, one type thereof may be solely used, and two or more types thereof may also be used in combination at any ratio.

Although the shape of the current collector is not particularly limited, it is preferable that the current collector have a sheet shape having a thickness of about 0.001 to 0.5 mm.

Preferably, the current collector is previously subjected to surface roughening treatment before use for increasing the binding strength to the electrode active material layer. Examples of the surface roughening method may include a mechanical polishing method, an electrolytic polishing method, and a chemical polishing method. In the mechanical polishing method, polishing cloth or paper to which abrasive particles are made to firmly adhere, grinding stone, emery buff, wire brush provided with, for example, a steel wire, or the like is used. Furthermore, in order to increase the binding strength and the electroconductivity of the electrode active material layer, an intermediate layer may be formed on the surface of the current collector.

[5.2. Electrode Active Material Layer]

The electrode active material layer is a layer provided on the current collector and contains an electrode active material.

As the electrode active material of the lithium ion secondary battery, that to and from which lithium ions can be reversibly intercalated and disintercalated by application of electric potential in the electrolyte solution may be used.

The positive electrode active materials are roughly classified into those made of an inorganic compound and those made of an organic compound. Examples of the positive electrode active material made of the inorganic compound may include transition metal oxide, complex oxide of lithium and transition metal, and transition metal sulfide. As the transition metal, Fe, Co, Ni, Mn, or the like is used. Specific examples of the inorganic compound used for the positive electrode active material may include lithium-containing complex metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; transition metal oxides such as $Cu_2V_2O_3$, amorphous $V_2O$—$P_2O_5$, $MoO_3$, $V_2O_5$, and $V_6O_{13}$. On the other hand, examples of the positive electrode active material made of the organic compound may include conductive polymers such as polyacethylene and poly-p-phenylene.

Furthermore, a positive electrode active material made of a composite material that is a combination of the inorganic compound and the organic compound may also be used.

For example, iron-based oxide may be subjected to reduction firing in the presence of a carbon source material to prepare a composite material covered with a carbon material, and the composite material may be used as the positive electrode active material. Although the iron-based oxide tends to have low electrical conductivity, the resultant can be used as the positive electrode active material having high performance by forming the above-mentioned composite material.

A material obtained by partial element substitution of the above-mentioned compound may also be used as the positive electrode active material.

As the positive electrode active material, one type thereof may be solely used, and two or more types thereof may also be used in combination at any ratio. Furthermore, a mixture of the aforementioned inorganic compound and organic compound may also be used as the positive electrode active material.

The particle diameter of the positive electrode active material may be appropriately selected in accordance with balance with other constituents of the lithium ion secondary battery. From the viewpoint of improvement in the battery properties such as the load property and the high temperature cycle property, the volume average particle diameter of the positive electrode active material is preferably equal to or larger than 0.1 µm and more preferably equal to or larger than 1 µm, and is preferably equal to or smaller than 50 µm and more preferably equal to or smaller than 20 µm. By setting the volume average particle diameter of the positive electrode active material to be within this range, a battery having large charging/discharging capacity can be obtained, and handling during production of a slurry composition for the positive electrode and the electrode can be facilitated.

The ratio of the positive electrode active material in the positive electrode active material layer is preferably equal to or higher than 90% by weight and more preferably equal to or higher than 95% by weight, and preferably equal to or lower than 99.9% by weight and more preferably equal to or lower than 99% by weight. By setting the amount of the positive electrode active material to be within the above-mentioned range, capacity of the lithium ion secondary battery can be increased. Moreover, flexibility of the positive electrode and the adhesiveness between the current collector and the positive electrode active material layer can be improved.

Examples of the negative electrode active material may include: carbonaceous materials such as amorphous carbon, graphite, natural graphite, mesocarbon microbeads, and pitch-based carbon fiber; and electroconductive polymers such as polyacene. Examples thereof may also include metals such as silicon, tin, zinc, manganese, iron, and nickel, and alloys thereof; oxides of these metals and alloys; and sulfates of these metals and alloys. In addition, metal lithium; lithium alloys such as Li—Al, Li—Bi—Cd, and Li—Sn—Cd; lithium transition metal nitrides; silicon, and the like may also be used. As the electrode active material, a material having a surface to which a conductive material is made to adhere by mechanical modification may also be used. As the negative electrode active material, one type thereof may be solely used, and two or more types thereof may also be used in combination at any ratio.

The particle diameter of the negative electrode active material is appropriately selected in accordance with balance with other constituents of the lithium ion secondary battery. From the viewpoint of improvement in the battery properties such as the initial efficiency, the load property, and the high temperature cycle property, the volume average particle diameter of the negative electrode active material is preferably equal to or larger than 0.1 µm, more preferably equal to or larger than 1 µm, and still more preferably equal to or larger than 5 µm, and preferably equal to or smaller than 100 µm, more preferably equal to or smaller than 50 µm, and still more preferably equal to or smaller than 20 µm.

The specific surface area of the negative electrode active material is preferably equal to or larger than 2 $m^2/g$, more preferably equal to or larger than 3 $m^2/g$, and still more preferably equal to or larger than 5 $m^2/g$, and preferably equal to or smaller than 20 $m^2/g$, more preferably equal to or smaller than 15 $m^2/g$, and still more preferably equal to or smaller than 10 $m^2/g$ from the viewpoint of improvement in output density. The specific surface area of the negative electrode active material may be measured by a BET method, for example.

The ratio of the negative electrode active material in the negative electrode active material layer is preferably equal to or higher than 85% by weight and more preferably equal to or higher than 88% by weight, and preferably equal to or lower than 99% by weight and more preferably equal to or lower than 97% by weight. By setting the amount of the negative electrode active material to be within the above-mentioned range, the negative electrode having excellent flexibility and adhesiveness with high capacity can be provided.

The electrode active material layer preferably contains a binder for an electrode in addition to the electrode active material. When the electrode active material layer contains the binder for the electrode, the adhesiveness of the electrode active material layer is improved and the strength against mechanical force applied in a process of winding the electrode is enforced. Further, removal of the electrode active material layer from the current collector is blocked and the risk of short circuit caused by the detached object that has removed is therefore reduced.

As the binder for the electrode, for example, a polymer may be used. As the polymer that may be used as the binder for the electrode, for example, the polymer that is selected from the same range as the polymer described as the optional binder for the adhesive layer may be used.

Furthermore, particles of soft polymers that will be exemplified below may also be used as the binder for the electrode. Examples of the soft polymer may include:

(i) acrylic soft polymers that are a homopolymer of a derivative of acrylic acid or methacrylic acid, or a copolymer of the derivative and a monomer copolymerizable therewith, such as polybutyl acrylate, polybutyl methacrylate, polyhydroxyethyl methacrylate, polyacrylamide, polyacrylonitrile, a butyl acrylate-styrene copolymer, a butyl acrylate-acrylonitrile copolymer, and a butyl acrylate-acrylonitrile-glycidyl methacrylate copolymer;

(ii) isobutylene-based soft polymers such as polyisobutylene, isobutylene-isoprene rubber and an isobutylene-styrene copolymer;

(iii) diene-based soft polymers such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer, a styrene-butadienestyrene block copolymer, an isoprene-styrene block copolymer, and a styrene-isoprene-styrene block copolymer;

(iv) silicon-containing soft polymers such as dimethyl polysiloxane, diphenyl polysiloxane, and dihydroxy polysiloxane;

(v) olefin-based soft polymers such as liquid polyethylene, polypropylene, poly-1-butene, an ethylene-α-olefin copolymer, a propylene-α-olefin copolymer, an ethylene-propylene-diene copolymer (EPDM), and an ethylene-propylene-styrene copolymer;

(vi) vinyl-based soft polymers such as polyvinyl alcohol, polyvinyl acetate, polyvinyl stearate, and a vinyl acetate-styrene copolymer;

(vii) epoxy-based soft polymers such as polyethylene oxide, polypropylene oxide, and epichlorhydrin rubber;

(viii) fluorine-containing soft polymers such as vinylidene fluoride-based rubber and tetrafluoroethylene-propylene rubber; and (ix) other soft polymers such as natural rubbers, polypeptides, proteins, polyester-based thermoplastic elastomers, vinyl chloride-based thermoplastic elastomers, and polyamide-based thermoplastic elastomers. Among them, the diene-based soft polymers and the acrylic soft polymers are preferable. These soft polymers may have a crosslinked structure or may have a functional group introduced by modification.

Furthermore, the particulate polymer of the present invention may be used as the binder for the electrode.

As the binder for the electrode, one type thereof may be solely used, and two or more types thereof may also be used in combination at any ratio.

The amount of the binder for the electrode in the electrode active material layer is preferably equal to or larger than 0.1 parts by weight, more preferably equal to or larger than 0.2 parts by weight, and particularly preferably equal to or larger than 0.5 parts by weight, and preferably equal to or smaller than 5 parts by weight and more preferably equal to or smaller than 3 parts by weight with respect to 100 parts by weight of the electrode active material. By setting the amount of the binder for the electrode to be within the above-mentioned range, the electrode active material can be prevented from detaching from the electrode without inhibition of battery reaction.

The electrode active material layer may contain an optional component other than the electrode active material and the binder for the electrode as long as the advantageous effects of the present invention are not significantly impaired. Examples of the optional component may include a conductive material and a reinforcing material. As the optional component, one type thereof may be solely used, and two or more types thereof may also be used in combination at any ratio.

Examples of the conductive material may include conductive carbons such as acetylene black, Ketjen black, carbon black, graphite, vapor-grown carbon fiber, and carbon nanotube; carbon powders such as black lead; and fibers and foils of a variety of metals. When the conductive material is used, electric contact between the electrode active materials can be improved and the battery properties such as the high temperature cycle property can be improved.

The specific surface area of the conductive material is preferably equal to or larger than 50 m$^2$/g, more preferably equal to or larger than 60 m$^2$/g, and particularly preferably equal to or larger than 70 m$^2$/g, and preferably equal to or smaller than 1500 m$^2$/g, more preferably equal to or smaller than 1200 m$^2$/g, and particularly preferably equal to or smaller than 1000 m$^2$/g. By setting the specific surface area of the conductive material to be equal to or larger than the lower limit of the above-mentioned range, the low temperature output property of the lithium ion secondary battery can be improved. By setting the specific surface area of the conductive material to be equal to or smaller than the upper limit, the adhesiveness between the electrode active material layer and the current collector can be increased.

As the reinforcing material, for example a variety of inorganic or organic spherical, plate-shaped, rod-shaped, or fibrous fillers may be used. Use of the reinforcement material can impart toughness and flexibility to the electrode, thereby providing excellent long-term high temperature cycle property.

Using amount of each of the conductive material and the reinforcement material is usually equal to or larger than 0 part by weight and preferably equal to or larger than 1 part by weight, and preferably equal to or smaller than 20 parts by weight and more preferably equal to or smaller than 10 parts by weight with respect to 100 parts by weight of the electrode active material.

The thickness of the electrode active material layer is preferably equal to or larger than 5 μm and more preferably equal to or larger than 10 μm, and preferably equal to or smaller than 300 μm and more preferably equal to or smaller than 250 μm for both the positive electrode and the negative electrode.

The method for producing the electrode active material layer is not particularly limited. The electrode active material layer may be produced by, for example, preparing a slurry composition for the electrode containing the electrode active material and the solvent, and if necessary, the binder for the electrode and the optional components, coating the current collector with the slurry for the electrode, and drying it. As the solvent, any of water and the organic solvents may be used.

[5.3. Porous Membrane Included in Electrode]

The electrode may include the above-mentioned porous membrane on the electrode plate. The porous membrane may be provided on only one surface of the electrode plate or may be provided on both surfaces thereof. The porous membrane preferably contains the particulate polymer of the present invention. The electrode may be produced by performing the above-mentioned method for producing the porous membrane using the electrode plate as the substrate, for example. In many cases, the porous membrane is provided on the electrode active material layer. Therefore the electrode usually includes the current collector, the electrode active material layer, and the porous membrane in this order.

[6. Lithium Ion Secondary Battery]

The lithium ion secondary battery includes the positive electrode, the negative electrode, and the electrolytic solution. The lithium ion secondary battery contains the particulate polymer of the present invention as the binder. For example, lithium ion secondary batteries having structures of the following (A) to (C) are exemplified.

(A) At least one of the positive electrode and the negative electrode includes the porous membrane or the electrode active material layer containing the particulate polymer of the present invention.

(B) The lithium ion secondary battery includes the separator, and the separator includes the porous membrane or the adhesive layer containing the particulate polymer of the present invention.

(C) The adhesive layer is included at any position in the lithium ion secondary battery.

The lithium ion secondary battery containing the particulate polymer of the present invention is excellent in the battery properties such as the low temperature output property because the particulate polymer has high adhesiveness in the electrolytic solution and high ion conductivity.

As the electrolytic solution, an organic electrolytic solution containing an organic solvent and a supporting electrolyte dissolved in the organic solvent may be preferably used.

As the supporting electrolyte, a lithium salt is used, for example. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$, and $CF_3SO_3Li$ are preferably used because they are highly soluble in a solvent and has a high dissociation degree. As the supporting electrolyte, one type thereof may be solely used, and two or more types thereof may also be used in combination at any ratio. Use of the supporting electrolyte having a higher dissociation degree tends to give higher lithium ion conductivity. The lithium ion conductivity can be therefore controlled by selecting the types of supporting electrolyte.

The concentration of the supporting electrolyte in the electrolytic solution is preferably equal to or higher than 1% by weight and more preferably equal to or higher than 5% by weight, and preferably equal to or lower than 30% by weight and more preferably equal to or lower than 20% by weight. Furthermore, the supporting electrolyte is usually used at a concentration of 0.5 to 2.5 mol/L depending on the types of the supporting electrolyte. By setting the amount of the supporting electrolyte to be within this range, ion conductivity can be increased, thereby making the charging property and discharging property of the lithium ion secondary battery preferable.

As the organic solvent that is used for the electrolytic solution, a solvent capable of dissolving the supporting electrolyte therein may be used. Examples of the solvent may preferably include: carbonate compounds such as dimethyl carbonate (DMC), ethylene carbonate (EC), diethyl carbonate (DEC), propylene carbonate (PC), butylene carbonate (BC), methyl ethyl carbonate (MEC), and vinylene carbonate (VC); ester compounds such as γ-butyrolactone and methyl formate; ether compounds such as 1,2-dimethoxyethane and tetrahydrofuran; and sulfur-containing compounds such as sulfolane and dimethylsulfoxide. One type thereof may be solely used, and two or more types thereof may also be used in combination at any ratio. Among them, the carbonate compounds are preferable because they have a high dielectric constant and a stable potential region in a wide range. Furthermore, as the viscosity of the solvent that is used is lower, the lithium ion conductivity tends to be higher. Based on this, the lithium ion conductivity can be controlled by the types of the solvent.

If necessary, the electrolytic solution may further contain an additive. As the additive, one type thereof may be solely used, and two or more types thereof may also be used in combination at any ratio.

In particular, in order to cause the particulate polymer to have high adhesiveness in the electrolytic solution, a solvent of the electrolytic solution that has a desired SP value is preferably used. The specific SP value of the solvent of the electrolytic solution is preferably equal to or higher than 8 $(cal/cm^3)^{1/2}$ and more preferably equal to or higher than 9 $(cal/cm^3)^{1/2}$, and preferably equal to or lower than 15 $(cal/cm^3)^{1/2}$ and more preferably equal to or lower than 14 $(cal/cm^3)^{1/2}$. Examples of the solvent having the SP value within the above-mentioned range may include cyclic ester compounds such as ethylene carbonate and propylene carbonate and chain ester compounds such as ethyl methyl carbonate and diethyl carbonate.

The method for producing the lithium ion secondary battery is not particularly limited. For example, the lithium ion secondary battery may be produced by stacking the negative electrode and the positive electrode as described above with the separator interposed therebetween, rolling or folding the stack in conformity with a battery shape to be placed in a battery container, pouring the electrolyte solution into the battery container, and then sealing the container. If necessary, an expanded metal; an overcurrent prevention element such as a fuse and a positive temperature coefficient (PTC) element; and a lead plate may be provided therein so as to prevent increase in internal pressure of the battery and overcharging and overdischarging thereof. The shape of the battery may be any of a laminated cell type, a coin type, a button type, a sheet type, a cylindrical type, a rectangular type, and a flat type.

EXAMPLES

The present invention will be described in detail with reference to the following Examples. However, the present invention is not limited to the following Examples and may be optionally modified for implementation in a range without departing from the scope of the present invention and equivalents thereto.

In the following description, "%" and "part" that represent an amount are on a weight basis, unless otherwise specified. The operations that will be described hereinbelow were performed under the conditions of room temperature and normal pressure, unless otherwise specified.

[Evaluation]

[1. Method for Measuring Change in Cell Volume Between Before and after High Temperature Cycle Test]

The 800 mAh-winding type lithium ion secondary battery produced in each of Examples and Comparative Examples was left to stand in an environment of 25° C. for 24 hours. Thereafter, in an environment of 25° C., a charging/discharging operation of charging the battery to 4.35 V at 0.1 C and discharging the battery to 2.75 V at 0.1 C was performed. The cell of the battery was immersed in liquid paraffin and a volume X0 of the cell was measured.

Furthermore, in an environment of 60° C., the charging/discharging operation was repeated under the same conditions as those as described above for 1000 cycles. The cell of the battery after 1000 cycles was immersed in the liquid paraffin and a volume X1 of the cell was measured.

The cell volume change ratio ΔX between before and after the high temperature cycle test in which the charging and discharging were repeated for 1000 cycles was calculated based on an equation ΔX (%)=(X1−X0)/X0×100. Lower value of the cell volume change ratio ΔX is indicative of better capability of preventing generation of the gas.

[2. Method for Measuring Peel Strength]

The sample produced in each of Examples and Comparative Examples was cut into a square of 10 mm in length×10 mm in width to obtain a test piece. The test piece was immersed into the electrolytic solution (solvent: EC/DEC/VC at a volume ratio of 68.5/30/1.5, electrolyte: $LiPF_6$ at a concentration of 1M) for 3 days. The test piece was taken out of the electrolytic solution, and the electrolyte solution on the surface of the test piece was wiped off.

Thereafter, a cellophane tape was affixed to the surface of the negative electrode with the surface thereof on the negative electrode side facing downward. As the cellophane tape, the one defined in JIS 21522 was used. The cellophane tape was secured to a horizontal test table in an upward direction. Then, stress when one end of the separator substrate was pulled vertically upward at a pulling rate of 50 mm/min and peeled was measured. This measurement was repeated three times, and an average value of the measurement stresses was calculated to obtain peel strength P. Larger value of the measured peel strength P is indicative of stronger adhesive force between the negative electrode and the separator, that is, stronger binding strength.

[3. Method for Evaluating High Temperature Cycle Property]

The 800 mAh-winding type lithium ion secondary battery produced in each of Examples and Comparative Examples was left to stand in an environment of 25° C. for 24 hours. Thereafter, in an environment of 25° C., a charging/discharging operation of charging the battery to 4.35 V at 0.1 C and discharging the battery to 2.75 V at 0.1 C was performed, to measure initial capacity C0.

Furthermore, in an environment of 60° C., the charging and discharging were repeated under the same conditions as those described above for 1000 cycles, to measure capacity C1 after 1000 cycles.

The capacity retention ratio $\Delta C$ was calculated based on an equation $\Delta C=C1/C0\times100(\%)$. Larger value of the capacity retention ratio $\Delta C$ is indicative of better high temperature cycle property of the lithium ion secondary battery and longer lifetime of the battery.

[4. Method for Evaluating Blocking Resistance]

The separator was cut into a square of 5 mm in length×5 mm in width and a square of 4 mm in length×4 mm in width, to obtain test pieces. A sample (sample in a non-pressed state) formed by stacking two test pieces and a sample (pressed sample) placed under pressure of 10 g/cm$^2$ at 40° C. after the stacking were prepared. These samples were left to stand for 24 hours. Adhesion states (blocking states) between the stacked separators of the samples after left to stand for 24 hours were evaluated based on the following criteria.

A: In the pressed sample, blocking between the separators was not observed.

B: In the pressed sample, blocking between the separators was observed but the separators were detached.

C: In the pressed sample, blocking between the separators was observed and the separators were not detached.

D: In the non-pressed sample, blocking between the separators was observed.

[5. Method for Evaluating Low Temperature Output Property]

The 800 mAh-winding type lithium ion secondary battery produced in each of Examples and Comparative Examples was left to stand in an environment of 25° C. for 24 hours. Thereafter, in an environment of 25° C., the lithium ion secondary battery was charged at a charging rate of 0.1 C for 5 hours and a voltage V0 at this time was measured. After that, in an environment of −10° C., the lithium ion secondary battery was discharged at a discharging rate of 1 C and a voltage V1 after 15 seconds from the start of discharging was measured.

Voltage change $\Delta V$ was calculated based on an equation $\Delta V=V0-V1$. Smaller value of the voltage change $\Delta V$ is indicative of better low temperature output property.

[6. Method for Evaluating Low Temperature Reception Property]

The 800 mAh-winding type lithium ion secondary battery produced in each of Examples and Comparative Examples was left to stand in an environment of 25° C. for 24 hours.

Thereafter, in an environment of 25° C., the battery was charged to 4.35 V at 1 C over 1 hour and charging capacity W0 at this time was measured. After that, the battery was discharged to 3.0 V at 1 C over 1 hour. Then, the battery was charged again to 4.35 V at 1 C over 1 hour in an environment of −10° C. and charging capacity W1 at this time was measured. Low temperature reception property $\Delta W$ was calculated based on an equation $\Delta W=W1/W0\times100(\%)$. Larger value of the low temperature reception property $\Delta W$ is indicative of better low temperature reception property.

[7. Method for Measuring Ion Conductivity]

The aqueous dispersion containing the particulate polymer produced in each of Examples and Comparative Examples was poured into a silicon container and dried at 60° C. for 72 hours to prepare a film of 1 mm in thickness, 1 cm in length, and 1 cm in width. The film was immersed in the $LiPF_6$ solution of 1.0 mol/L (solvent: a mixture of ethylene carbonate/diethyl carbonate/vinylene carbonate at a volume ratio of 68.5/30/1.5) at 60° C. for 72 hours and the thickness d of the film after the immersion was measured. Thereafter, the film was interposed between two copper foils and the resistance R was measured from an alternating current impedance in the range of 0.001 Hz to 1000000 Hz. The ion conductivity=$R\times1/d$ was calculated from the thickness d and the resistance R.

[8. Method for Measuring Tensile Strength]

The aqueous dispersion containing the particulate polymer produced in each of Examples and Comparative Examples was poured into a silicon container and dried at 60° C. for 72 hours to prepare a film of 1 mm in thickness, 1 cm in length, and 8 cm in width. The film was immersed in the $LiPF_6$ solution of 1.0 mol/L (solvent: a mixture of ethylene carbonate/diethyl carbonate/vinylene carbonate at a volume ratio of 68.5/30/1.5) at 60° C. for 72 hours to effect swelling of the film. The swollen film was stretched at a speed of 50 ram/min in accordance with JIS-K5301 and the strength at the time of breakage was measured three times. The average value of the measured strength values at the time of breakage was calculated as the tensile strength of the film.

[9. Method for Measuring Core-Shell Ratio]

The particulate polymer was sufficiently dispersed in visible light-curable resin ("D-800" manufactured by JEOL Ltd.), and then embedded to prepare a block piece containing the particulate polymer. Then, the block piece was cut out into a thin piece having a thickness of 100 nm using a microtome with a diamond blade to prepare a sample for measurement. Thereafter, dye treatment was performed on the measurement sample using ruthenium tetroxide.

Subsequently, the dyed measurement sample was set to a transmission electron microscope ("JEM-3100F" manufactured by JEOL Ltd.) and the cross-sectional structure of the particulate polymer was photographed at an accelerating voltage of 80 kV. The magnification of the electron microscope was set to a magnification with which the cross section of one particulate polymer was within the field of view.

Then, the photographed cross-sectional structure of the particulate polymer was observed and the average thickness of the shell portion of the particulate polymer was measured in the following procedures in accordance with the observed structure of the shell portion.

When the shell portion was formed by particles of the polymer, the maximum diameter of the particles of the polymer forming the shell portion was measured on the cross-sectional structure of the particulate polymer. The maximum diameter of the particles of the polymer forming the shell portion was measured for 20 particulate polymers that had been randomly selected and an average value of the maximum diameters was taken as the average thickness of the shell portion.

When the shell portion has a shape other than the particulate shape, the maximum thickness of the shell portion was measured on the cross-sectional structure of the particulate polymer. The maximum thickness of the shell portion was measured for 20 particulate polymers that had been randomly selected and an average value of the maximum thicknesses was taken as the maximum thickness of the shell portion.

Then, the core-shell ratio was calculated by dividing the measured average thickness of the shell portion by the volume average particle diameter of the particulate polymer.

[10. Method for Measuring Average Ratio of Outer Surface of Core Portion of Particulate Polymer that is Covered by Shell Portion]

The particulate polymer was sufficiently dispersed in visible light-curable resin ("D-800" manufactured by JEOL Ltd.), and then embedded to prepare a block piece containing the particulate polymer. Then, the block piece was cut out into a thin piece having a thickness of 100 nm using a microtome with a diamond blade to prepare a sample for measurement. Thereafter, dye treatment was performed on the measurement sample using ruthenium tetroxide.

Subsequently, the dyed measurement sample was set to a transmission electron microscope ("JEM-3100F" manufactured by JEOL Ltd.) and the cross-sectional structure of the particulate polymer was photographed at an accelerating voltage of 80 kV. The magnification of the electron microscope was set to a magnification with which the cross section of one particulate polymer was within the field of view.

The length D1 of a circumference of the core portion and the length D2 of a portion on which the outer surface of the core portion and the shell portion abutted against each other were measured on the photographed cross-section structure of the particulate polymer. The ratio Rc of the outer surface of the core portion of the particulate polymer that is covered by the shell portion was calculated based on the following equation (1).

$$\text{Coverage } Rc\ (\%) = D2/D1 \times 100 \tag{1}$$

The above-mentioned coverage Rc was measured for 20 particulate polymers that had been randomly selected and an average value thereof was calculated. The average value was taken as the average ratio of the outer surface of the core portion that is covered by the shell portion.

[11. Method for Measuring Swelling Degree of Polymer Forming Core Portion]

An aqueous dispersion containing the polymer forming the core portion was produced in the same manner as the method for producing the aqueous dispersion containing the polymer forming the core portion in each of Examples and Comparative Examples. The aqueous dispersion was poured into a petri dish made of polytetrafluoroethylene and was dried at 25° C. for 48 hours to produce a film having a thickness of 0.5 mm.

The film was cut into a 1 cm-square, to obtain a test piece. The weight of the test piece was measured and was set to W0.

The test piece was immersed in the electrolytic solution at 60° C. for 72 hours. Then, the test piece was taken out of the electrolytic solution and the electrolytic solution on the surface of the test piece was wiped off. A weight W1 of the test piece after the immersion test was measured.

The swelling degree S (factor) was calculated based on an equation S=W1/W0 using these weights W0 and W1.

The electrolytic solution for use in this measurement was prepared by dissolving $LiPF_6$ as the supporting electrolyte at a concentration of 1.0 mol/L in a mixed solvent of ethylene carbonate, diethyl carbonate, and vinylene carbonate (volume mixing ratio of EC/DEC/VC=68.5/30/1.5; SP value 12.7 $(cal/cm^3)^{1/2}$) was used.

[12. Method for Measuring Swelling Degree of Polymer Forming Shell Portion]

An aqueous dispersion containing the particulate polymer formed by the polymer forming the shell portion was produced in the same manner as the method for producing the aqueous dispersion containing the particulate polymer in each of Examples and Comparative Examples except that a monomer composition used for producing the shell portion was used in place of the monomer composition used for producing the core portion. The swelling degree S of the polymer forming the shell portion was measured in the same manner as the method for measuring the swelling degree of the polymer forming the core portion except that the aqueous dispersion containing the particulate polymer formed by the polymer forming the shell portion was used as the aqueous dispersion for producing the test piece.

[13. Method for Measuring Glass Transition Temperature]

A differential scanning calorimeter ("EXSTAR DSC6220" manufactured by SII NanoTechnology) was used, and the measurement sample of 10 mg was weighed into an aluminum pan. The DSC curve of the measurement sample was measured at a temperature rising rate of 10° C./min in a measurement temperature range of −100° C. to 500° C. under a normal temperature and normal humidity using an empty aluminum pan as a reference. In this temperature rising process, an intersection of a baseline immediately before a heat adsorption peak of the DSC curve at which a differentiated signal (DDSC) was equal to or higher than 0.05 mW/min/mg and a tangent line of the DSC curve at an inflexion point appearing first after the heat adsorption peak was calculated as the glass transition temperature.

Example 1

1-1. Production of Optional Binder

To a reactor equipped with a stirrer, 70 parts of ion exchange water, 0.15 parts of sodium lauryl sulfate ("Aimard 2F" manufactured by Kao Chemicals) as an emulsifier, and 0.5 parts of ammonium persulfate were supplied. A gas phase portion in the reactor was substituted with nitrogen gas and it was heated to 60° C.

Meanwhile, in another container, 50 parts of ion exchange water, 0.5 parts of sodium dodecylbenzenesulfonate as a dispersing agent, and, as polymerizable monomers, 94 parts of butyl acrylate, 2 parts of acrylonitrile, 2 parts of methacrylic acid, 1 part of N-methylolacrylamide, and 1 part of acrylamide were mixed to obtain a monomer mixture. This monomer mixture was continuously added to the above-mentioned reactor over four hours for polymerization. During the addition of the monomer mixture, the reaction was performed at 60° C. After the addition of the monomer mixture was completed, the monomer mixture was further stirred at 70° C. for 3 hours and then the reaction was terminated to produce an aqueous dispersion containing (meth)acryl polymer as an optional binder. The (meth)acryl polymer in the aqueous dispersion was in a form of particles.

The volume average particle diameter D50 of the obtained (meth)acryl polymer was 0.36 μm and the glass transition temperature thereof was −45° C.

1-2. Production of Particulate Polymer

In a 5 MPa pressure-resistant container equipped with a stirrer, 75 parts of methyl methacrylate, 4 parts of methacrylic acid, and 1 part of ethylene dimethacrylate as the monomer composition for producing the core portion, 1 part of sodium dodecylbenzenesulfonate as an emulsifier, 150 parts of ion exchange water, and 0.5 parts of potassium persulfate as a polymerization initiator were placed and sufficiently stirred. Then, the mixture was warmed to 60° C. to initiate polymerization. The polymerization was continued until the polymerization conversion ratio reached 96% to obtain an aqueous dispersion containing the particle polymer forming the core portion.

Subsequently, 20 parts of styrene as a monomer composition for producing the shell portion was continuously added to the aqueous dispersion. The mixture was warmed to 70° C. and polymerization was continued. Then, the mixture was cooled to terminate the reaction at a time point when the polymerization conversion rate reached 96%, to thereby produce an aqueous dispersion containing the particulate polymer. The volume average particle diameter D50 of the obtained particulate polymer was 0.45 μm.

For the obtained particulate polymer, the core-shell ratio and the average ratio of the outer surface of the core portion of the particulate polymer that is covered by the shell portion were measured by the above-mentioned methods.

1-3. Production of Porous Membrane Composition

Alumina ("LS256" manufactured by Nippon Light Metal Company, Ltd) as the non-conductive particles was prepared.

Carboxymethyl cellulose ("Daicel 1220" manufactured by Daicel FineChem Ltd., etherification degree of 0.8 to 1.0) as a viscosity modifier was prepared. The viscosity of a 1% aqueous solution of the viscosity modifier was 10 mPa·s to 20 mPa·s.

100 parts of alumina, 1.5 parts of the viscosity modifier and ion exchange water were mixed and dispersed such that the solid content concentration was 40% by weight. Furthermore, 6 parts in terms of solid content of the aqueous dispersion containing the (meth)acryl polymer as the binder for the porous membrane and 0.2 parts of a polyethylene glycol-type surfactant ("SN-WET 366" manufactured by SAN NOPCO LIMITED) were mixed to produce a slurry porous membrane composition.

1-4. Production of Slurry for Adhesive Layer 100 parts in terms of solid content of an aqueous dispersion containing the particulate polymer, 6 parts in terms of solid content of an aqueous dispersion containing the (meth)acryl polymer, and 0.2 parts of the polyethylene glycol-type surfactant ("SN-WET 366" manufactured by SAN NOPCO LIMITED) were mixed to produce a slurry for the adhesive layer.

1-5. Production of Separator for Secondary Battery

An organic separator (thickness 16 μm and Gurley value 210 s/100 cc) made of polyethylene was prepared as a separator substrate. Both the surfaces of the prepared separator substrate were coated with the porous membrane composition and dried at 50° C. for 3 minutes. Thus, porous membranes having a thickness of 3 μm per layer were provided on both the surfaces of the separator substrate.

Then, each porous membrane was coated with the slurry for the adhesive layer by the spray coating method and dried at 50° C. for 1 minute to form adhesive layers having a thickness of 2 μm per layer.

With these processes, a separator including the adhesive layer, the porous membrane, the separator substrate, the porous membrane, and the adhesive layer in this order was obtained. The blocking resistance of this separator was evaluated by the above-mentioned method.

1-6. Production of Binder for Negative Electrode

In a 5 MPa pressure-resistant container equipped with a stirrer, 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of ion exchange water, and 0.5 parts of potassium persulfate as a polymerization initiator were placed and sufficiently stirred. Then, the mixture was warmed to 50° C. to initiate polymerization. The mixture was cooled to terminate the reaction at a time point when the polymerization conversion rate reached 96% to obtain a mixture containing a particulate binder (SBR) for the negative electrode. A 5% aqueous sodium hydroxide solution was added to the mixture containing the binder for the negative electrode and its pH was adjusted to pH8. Thereafter, unreacted monomers were removed by distillation under heating and reduced pressure. The resultant mixture was cooled to equal to or lower than 30° C. to thereby obtain an aqueous dispersion containing the desired binder for the negative electrode.

1-7. Production of Slurry Composition for Negative Electrode 100 parts of an artificial graphite (volume average particle diameter: 15.6 μm) as a negative electrode active material and 1 parts in terms of solid content of a 2%-aqueous solution of carboxymethyl cellulose sodium salt ("MAC350HC" manufactured by Nippon Paper Chemicals Co., Ltd.) as a thickening agent were mixed. Furthermore, ion exchange water was added thereto to adjust the solid content concentration thereof to 68%. The resultant mixture was mixed at 25° C. for 60 minutes. Subsequently, ion exchange water was further added thereto to adjust the solid content concentration thereof to 62%, and then the resultant mixture was mixed at 25° C. for 15 minutes. To the mixture thus obtained, 1.5 parts in terms of solid content by weight of the above-mentioned binder for the negative electrode was added. Furthermore, ion exchange water was added thereto to adjust the final solid content concentration to 52%, and the mixing was further performed for 10 minutes. The resultant mixture was subjected to defoaming treatment under reduced pressure, to thereby obtain a slurry composition for a negative electrode having high flowability.

1-8. Production of Negative Electrode

A copper foil having a thickness of 20 μm as the current collector was coated with the above-mentioned slurry composition for the negative electrode using a comma coater such that the film thickness after drying was approximately 150 μm, and it was dried. The drying was performed by conveying the copper foil through an oven at 60° C. at a speed of 0.5 m/min over 2 minutes. Subsequently, heat treatment was performed at 120° C. for 2 minutes to obtain a pre-press raw material for a negative electrode. This pre-press raw material for the negative electrode was rolled by roll press to obtain a pressed negative electrode with a negative electrode active material layer having a thickness of 80 μm.

1-9. Production of Slurry Composition for Positive Electrode 100 parts in terms of solid content of $LiCoO_2$ (volume average particle diameter of 12 μm) as the positive electrode active material, 2 parts of acetylene black ("HS-100" manufactured by Denka Company Limited.) as the conductive material, and 2 parts of polyvinylidene fluoride ("#7208" manufactured by KUREHA CORPORATION) as the binder for the positive electrode were mixed. Furthermore, N-methylpyrrolidone was added thereto to adjust the solid content concentration thereof to 70%. The resultant mixture was mixed by a planetary mixer, to thereby obtain a slurry composition for a positive electrode.

1-10. Production of Positive Electrode

An aluminum foil having a thickness of 20 μm as the current collector was coated with the above-mentioned slurry composition for the positive electrode using a comma coater such that the film thickness after drying was approximately 150 μm, and it was dried. The drying was performed by conveying the aluminum foil through an oven at 60° C. at a speed of 0.5 m/min over 2 minutes. Subsequently, heat treatment was performed at 120° C. for 2 minutes to obtain a pre-press raw material for a positive electrode. This pre-press raw material for the positive electrode was rolled by roll press to obtain a pressed positive electrode with a positive electrode active material layer having a thickness of 10 μm.

1-11. Production of Lithium Ion Secondary Battery

The above-mentioned pressed positive electrode was cut into a square of 49×5 $cm^2$. The separator cut into 55×5.5 $cm^2$ was disposed on the surface of the positive electrode at the positive electrode active material layer side. Furthermore, the above-mentioned pressed negative electrode was cut into a rectangular shape of 50×5.2 $cm^2$. The negative electrode was disposed on the separator such that the surface thereof on the negative electrode active material side faced the separator. The multilayer body thus obtained including the positive electrode, the separator, and the negative electrode in this order was wound by a winding machine to obtain a wound body. The wound body was pressed at 0.5 MPa at 60° C. to obtain a flat body. The flat body was packaged with an aluminum exterior package as an exterior of the battery. An electrolytic solution (solvent: EC/DEC/VC at a volume ratio of 68.5/30/1.5, electrolyte: $LiPF_6$ at a concentration of 1 M) was injected into the exterior package such that the air does not remain therein. Furthermore, in order to closely seal an opening of the exterior package, the heat sealing was performed at 150° C. to close the exterior package, whereby a 800 mAh-winding type lithium ion secondary battery was produced.

The cell volume change ratio $\Delta X$, the capacity retention ratio $\Delta C$, the voltage change $\Delta V$, and the low temperature reception property $\Delta W$ were measured by the above-mentioned methods using the lithium ion secondary battery.

1-12. Production of Sample for Measuring Peel Strength

The negative electrode was cut into a disc shape having a diameter of 14 mm to obtain a disc-shaped negative electrode. Furthermore, the separator was cut into a disc shape having a diameter of 18 mm to obtain a disc-shaped separator for a secondary battery.

The negative electrode was laid along the surface of the disc-shaped separator in such a direction that the surface thereof on the negative electrode active material layer side came in contact with the separator. In this manner, a multilayer body including the negative electrode and the separator was obtained. The multilayer body was thermally pressed at a temperature of 80° C. and pressure of 0.5 MPa for 10 seconds and the negative electrode was pressure-bonded to the separator to obtain a sample for measuring the peel strength. The peel strength was measured by the above-mentioned method by using this sample.

Example 2

The amount of methyl methacrylate was changed to 75.85 parts and the amount of ethylene dimethacrylate was changed to 0.15 parts in the monomer composition used for producing the core portion in the process (1-2).

A lithium ion secondary battery was produced and evaluated in the same manner as in Example 1 except the above-mentioned points.

Example 3

The amount of methyl methacrylate was changed to 71.5 parts and the amount of ethylene dimethacrylate was changed to 4.5 parts in the monomer composition used for producing the core portion in the process (1-2).

A lithium ion secondary battery was produced and evaluated in the same manner as in Example 1 except the above-mentioned points.

Example 4

The amount of methyl methacrylate was changed to 75.95 parts and the amount of ethylene dimethacrylate was changed to 0.05 parts in the monomer composition used for producing the core portion in the process (1-2).

A lithium ion secondary battery was produced and evaluated in the same manner as in Example 1 except the above-mentioned points.

Example 5

55 parts of methyl methacrylate and 20 parts of 2-ethylhexyl acrylate were used in combination in place of 75 parts of methyl methacrylate in the monomer composition used for producing the core portion in the process (1-2).

A lithium ion secondary battery was produced and evaluated in the same manner as in Example 1 except the above-mentioned point.

Example 6

75 parts of acrylonitrile was used in place of 75 parts of methyl methacrylate in the monomer composition used for producing the core portion in the process (1-2).

A lithium ion secondary battery was produced and evaluated in the same manner as in Example 1 except the above-mentioned point.

Example 7

65 parts of acrylonitrile and 10 parts of 2-ethylhexyl acrylate were used in combination in place of 75 parts of methyl methacrylate in the monomer composition used for producing the core portion in the process (1-2).

A lithium ion secondary battery was produced and evaluated in the same manner as in Example 1 except the above-mentioned point.

Example 8

72 parts of acrylonitrile was used in place of 75 parts of methyl methacrylate and the amount of ethylene dimethacrylate was changed to 4.0 parts in the monomer composition used for producing the core portion in the process (1-2).

A lithium ion secondary battery was produced and evaluated in the same manner as in Example 1 except the above-mentioned points.

Example 9

10 parts of styrene and 10 parts of acrylonitrile were used in combination in place of 20 parts of styrene in the monomer composition used for producing the shell portion in the process (1-2).

A lithium ion secondary battery was produced and evaluated in the same manner as in Example 1 except the above-mentioned point.

Example 10

5 parts of styrene and 15 parts of acrylonitrile were used in combination in place of 20 parts of styrene in the monomer composition used for producing the shell portion in the process (1-2).

A lithium ion secondary battery was produced and evaluated in the same manner as in Example 1 except the above-mentioned point.

Example 11

20 parts of a sodium salt of styrenesulfonic acid was used in place of 20 parts of styrene in the monomer composition used for producing the shell portion in the process (1-2).

A lithium ion secondary battery was produced and evaluated in the same manner as in Example 1 except the above-mentioned point.

Example 12

15 parts of a sodium salt of styrenesulfonic acid and 5 parts of acrylonitrile were used in combination in place of 20 parts of styrene in the monomer composition used for producing the shell portion in the process (1-2).

A lithium ion secondary battery was produced and evaluated in the same manner as in Example 1 except the above-mentioned point.

Example 13

The amount of methyl methacrylate was changed to 72.5 parts and ethylene dimethacrylate was not used in the monomer composition used for producing the core portion in the process (1-2).

3.5 parts of ethylene dimethacrylate was used in combination with 20 parts of styrene in the monomer composition used for producing the shell portion in the process (1-2).

A lithium ion secondary battery was produced and evaluated in the same manner as in Example 1 except the above-mentioned points.

Example 14

74.5 parts of methyl methacrylate and 0.5 parts of 2,2,2-trifluoroethyl methacrylate were used in combination in place of 75 parts of methyl methacrylate in the monomer composition used for producing the core portion in the process (1-2).

A lithium ion secondary battery was produced and evaluated in the same manner as in Example 1 except the above-mentioned point.

Example 15

65 parts of methyl methacrylate and 10 parts of 2,2,2-trifluoroethyl methacrylate were used in combination in place of 75 parts of methyl methacrylate in the monomer composition used for producing the core portion in the process (1-2).

A lithium ion secondary battery was produced and evaluated in the same manner as in Example 1 except the above-mentioned point.

Example 16

57 parts of methyl methacrylate and 18 parts of 2,2,2-trifluoroethyl methacrylate were used in combination in place of 75 parts of methyl methacrylate in the monomer composition used for producing the core portion in the process (1-2).

A lithium ion secondary battery was produced and evaluated in the same manner as in Example 1 except the above-mentioned point.

Example 17

65 parts of methyl methacrylate and 10 parts of perfluoropropyl methacrylate were used in combination in place of 75 parts of methyl methacrylate in the monomer composition used for producing the core portion in the process (1-2).

A lithium ion secondary battery was produced and evaluated in the same manner as in Example 1 except the above-mentioned point.

Example 18

The amount of methyl methacrylate was changed to 87.5 parts and the amount of ethylene dimethacrylate was changed to 3.5 parts in the monomer composition used for producing the core portion in the process (1-2).

Furthermore, the amount of styrene was changed to 5 parts in the monomer composition used for producing the shell portion in the process (1-2).

A lithium ion secondary battery was produced and evaluated in the same manner as in Example 1 except the above-mentioned points.

Example 19

The amount of methyl methacrylate was changed to 52.5 parts and the amount of ethylene dimethacrylate was changed to 3.5 parts in the monomer composition used for producing the core portion in the process (1-2).

Furthermore, the amount of styrene was changed to 40 parts in the monomer composition used for producing the shell portion in the process (1-2).

A lithium ion secondary battery was produced and evaluated in the same manner as in Example 1 except the above-mentioned points.

Example 20

20-1. Production of Separator for Secondary Battery

An organic separator (thickness 16 µm and Gurley value 210 s/100 cc) made of polyethylene was prepared as a separator substrate. Both the surfaces of the prepared separator substrate were coated with the slurry for the adhesive layer produced in the process (1-4) in Example 1 by the spray coating method and dried at 50° C. for 1 minute to form adhesive layers having a thickness of 4 µm per layer. With these processes, a separator including the adhesive layer, the separator substrate, and the adhesive layer in this order was obtained. The blocking resistance of this separator was evaluated by the above-mentioned method.

20-2. Production of Negative Electrode

An electrode plate having the same structure as that of the pressed negative electrode obtained in the process (1-8) in Example 1 was prepared. The negative electrode active material layer of the electrode plate was coated with the porous membrane composition obtained in the process (1-3) in Example 1 by a gravure coater such that a coating amount after drying was 6 mg/cm$^2$, and it was dried. The drying was performed by conveying the electrode plate through an oven at 100° C. at a speed of 20 m/min over 1 minute. With these processes, a negative electrode including the current collector, the negative electrode active material layer, and the porous membrane was obtained.

20-3. Production of Lithium Ion Secondary Battery

A 800 mAh-winding type lithium ion secondary battery was produced in the same manner as the process (1-11) in Example 1 except that, as the separator and the negative electrode, those produced in Example 20 were used. The cell volume change ratio $\Delta X$, the capacity retention ratio $\Delta C$, the voltage change $\Delta V$, and the low temperature reception property $\Delta W$ were measured by the above-mentioned methods using the lithium ion secondary battery.

20-4. Production of Sample for Measuring Peel Strength

The negative electrode produced in Example 20 was cut into a disc shape having a diameter of 14 mm to obtain a disc-shaped negative electrode. Furthermore, the separator produced in Example 20 was cut into a disc shape having a diameter of 18 mm to obtain a disc-shaped separator for a secondary battery.

The negative electrode was laid along the surface of the disc-shaped separator in such a direction that the surface thereof on the porous membrane side came in contact with the separator. In this manner, a multilayer body including the negative electrode and the separator was obtained. The multilayer body was thermally pressed at a temperature of 80° C. and pressure of 0.5 MPa for 10 seconds and the negative electrode was pressure-bonded to the separator to obtain a sample for measuring the peel strength. The peel strength was measured by the above-mentioned method by using the sample.

Example 21

The thickness of an adhesive layer per layer was changed to 0.5 µm in the process (1-3).

A lithium ion secondary battery was produced and evaluated in the same manner as in Example 1 except the above-mentioned points.

Example 22

The thickness of the adhesive layer per layer was changed to 4 µm in the process (1-3).

A lithium ion secondary battery was produced and evaluated in the same manner as in Example 1 except the above-mentioned points.

Example 23

5 parts of the particulate polymer produced in the process (1-2) was further added as the binder for the porous membrane in the process (1-3). The adhesive layer was not provided on the separator in the process (1-5).

A lithium ion secondary battery was produced and evaluated in the same manner as in Example 1 except the above-mentioned points.

Comparative Example 1

An N-methylpyrrolidone solution of polyvinylidene fluoride was used in place of the slurry for the adhesive layer produced in Example 1 in the process (1-5).

A lithium ion secondary battery was produced and evaluated in the same manner as in Example 1 except the above-mentioned point.

Comparative Example 2

70 parts of methyl methacrylate, 25 parts of acrylonitrile, and 5 parts of methacrylic acid were used in combination in place of 75 parts of methyl methacrylate, 4 parts of methacrylic acid, and 1 part of ethylene dimethacrylate in the monomer composition used for producing the core portion in the process (1-2).

The monomer composition used for producing the shell portion was not used in the process (1-2).

Furthermore, in the process (1-4), 100 parts of alumina that is the same as that used in the process (1-3) in Example 1 with respect to 100 parts of the particulate polymer was added to the slurry for the adhesive layer.

A lithium ion secondary battery was produced and evaluated in the same manner as in Example 1 except the above-mentioned points.

Comparative Example 3

In a 5 MPa pressure-resistant container equipped with a stirrer, 99.9 parts of styrene, 0.1 parts of methacrylic acid, 1 part of sodium dodecylbenzenesulfonate as an emulsifier, 150 parts of ion exchange water, and 0.5 parts of potassium persulfate as a polymerization initiator were placed and sufficiently stirred. Then, the mixture was warmed to 80° C.

to initiate polymerization. The mixture was cooled to terminate the reaction at a time point when the polymerization conversion rate reached 96% to obtain a mixture containing polystyrene particles. A 5% aqueous sodium hydroxide solution was added to the mixture containing the polystyrene particles and its pH was adjusted to pH8. Thereafter, unreacted monomers were removed from the mixture containing the polystyrene particles by distillation under heating and reduced pressure. The resultant mixture was cooled to equal to or lower than 30° C. to thereby obtain an aqueous dispersion containing the desired polystyrene particles. The volume average particle diameter of the polystyrene particles was 0.45 μm.

100 parts in terms of solid content of the aqueous dispersion containing the polystyrene particles, 6 parts in terms of solid content of the aqueous dispersion containing the (meth)acryl polymer that was produced in the process (1-1) in Example 1, and 0.2 parts of polyethylene glycol-type surfactant ("SN-WET 366" manufactured by SAN NOPCO LIMITED) were mixed to produce a slurry for the adhesive layer.

The slurry for the adhesive layer produced in Comparative Example 3 was used as the slurry for the adhesive layer in the process (1-5).

A lithium ion secondary battery was produced and evaluated in the same manner as in Example 1 except the above-mentioned point.

Comparative Example 4

60 parts of 2-ethylhexyl acrylate, 15 parts of styrene, and 5 parts of methacrylic acid were used in place of 75 parts of methyl methacrylate, 4 parts of methacrylic acid, and 1 part of ethylene dimethacrylate in the monomer composition used for producing the core portion in the process (1-2).

A lithium ion secondary battery was produced and evaluated in the same manner as in Example 1 except the above-mentioned point.

Comparative Example 5

50 parts of methyl methacrylate, 25 parts of acrylonitrile, and 5 parts of methacrylic acid were used in place of 75 parts of methyl methacrylate, 4 parts of methacrylic acid, and 1 part of ethylene dimethacrylate in the monomer composition used for producing the core portion in the process (1-2).

A lithium ion secondary battery was produced and evaluated in the same manner as in Example 1 except the above-mentioned point.

Comparative Example 6

50 parts of methyl methacrylate, 25 parts of 2-ethylhexyl acrylate, and 5 parts of methacrylic acid were used in place of 75 parts of methyl methacrylate, 4 parts of methacrylic acid, and 1 part of ethylene dimethacrylate in the monomer composition used for producing the core portion in the process (1-2).

20 parts of acrylonitrile was used in place of 20 parts of styrene in the monomer composition used for producing the shell portion in the process (1-2).

A lithium ion secondary battery was produced and evaluated in the same manner as in Example 1 except the above-mentioned point.

RESULTS

Results of Examples and Comparative Examples are indicated in the following tables. In the following tables, meanings of abbreviations are as follows. In fields of monomers, numerical values next to the abbreviations of the monomers represent amounts of the monomers.
BA: butyl acrylate
AN: acrylonitrile
MAA: methacrylic acid
NMA: N-methylolacrylamide
AAm: acrylamide
MMA: methyl methacrylate
EDMA: ethylene dimethacrylate
ST: styrene
2-EHA: 2-ethylhexyl acrylate
F monomer: fluorine group-containing monomer
TFEMA: 2,2,2-trifluoroethyl methacrylate
PFPMA: perfluoropropyl methacrylate
NaSS: sodium salt of styrenesulfonic acid
PVDF: polyvinylidene fluoride
PST: polystyrene
Core-shell ratio: core-shell ratio
Cover ratio: average ratio of outer surface of core portion of particulate polymer that is covered by shell portion
Tg: glass transition temperature
MV: volume average particle diameter
P: peel strength
ΔW: low temperature reception property
ΔC: capacity retention ratio
ΔX: cell volume change ratio
ΔV: voltage change

TABLE 1

| | | [Results of Examples 1 to 4] | | | | |
|---|---|---|---|---|---|---|
| | | | Ex. 1 | Ex. 2 | Ex. 3 | Ex. 4 |
| Porous membrane | Non-conductive particles | | $Al_2O_3$ | $Al_2O_3$ | $Al_2O_3$ | $Al_2O_3$ |
| | Binder | Monomer | BA 94 | BA 94 | BA 94 | BA 94 |
| | | | AN 2 | AN 2 | AN 2 | AN 2 |
| | | | MAA 2 | MAA 2 | MAA 2 | MAA 2 |
| | | | NMA 1 | NMA 1 | NMA 1 | NMA 1 |
| | | | AAm 1 | AAm 1 | AAm 1 | AAm 1 |
| | | Amount | 6 parts | 6 parts | 6 parts | 6 parts |
| | Water-soluble polymer | Type | Daicel1220 | Daicel1220 | Daicel1220 | Daicel1220 |
| | | Amount | 1.5 parts | 1.5 parts | 1.5 parts | 1.5 parts |

TABLE 1-continued

[Results of Examples 1 to 4]

|  |  |  | Ex. 1 | Ex. 2 | Ex. 3 | Ex. 4 |
|---|---|---|---|---|---|---|
|  | Adhesive layer |  |  |  |  |  |
| Particulate polymer | Crosslinkable monomer | Type | EDMA | EDMA | EDMA | EDMA |
|  |  | Amount | 1 wt % | 0.15 wt % | 4.5 wt % | 0.05 wt % |
|  | Core portion | Swelling degree | 9.6 times | 19.5 times | 5.2 times | 28.5 times |
|  |  | Monomer | MMA 75 MAA 4 EDMA 1 | MMA 75.85 MAA 4 EDMA 0.15 | MMA 71.5 MAA 4 EDMA 4.5 | MMA 75.95 MAA 4 EDMA 0.05 |
|  |  | F monomer type | — | — | — | — |
|  |  | F monomer amount | — | — | — | — |
|  |  | Tg | 91° C. | 92° C. | 89° C. | 92° C. |
|  | Shell portion | Swelling ratio | 1.3 times | 1.3 times | 1.3 times | 1.3 times |
|  |  | Monomer | ST 20 | ST 20 | ST 20 | ST 20 |
|  |  | Tg | 100° C. | 100° C. | 100° C. | 100° C. |
|  | Core-shell ratio |  | 10% | 10% | 10% | 10% |
|  | Cover ratio |  | 65% | 64% | 64% | 61% |
|  | MV |  | 0.45 μm | 0.45 μm | 0.45 μm | 0.45 μm |
| Optional binder | Monomer |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  | Amount |  | 6 parts | 6 parts | 6 parts | 6 parts |
| Others |  |  | — | — | — | — |
| Thickness |  |  | 2 μm | 2 μm | 2 μm | 2 μm |
| Ion conductivity | (S/cm) |  | $4.5 \times 10^1$ | $8.9 \times 10^1$ | $9.6 \times 10^{-1}$ | $6.7 \times 10^1$ |
| Tensile fracture strength | (N/cm$^2$) |  | 1080 | 670 | 1220 | 800 |
| Adhesiveness | P(N/m) |  | 5.5 | 4.7 | 6.5 | 5.2 |
| Blocking resistance |  |  | A | A | A | A |
| Low temperature reception property | ΔW(%) |  | 77% | 78% | 72% | 78% |
| High temperature cycle property | ΔC(%) |  | 85.50% | 83.80% | 84.40% | 82.00% |
| Cell expansion property | ΔX(%) |  | 22% | 23% | 24% | 25% |
| Low Temperature output property | ΔV(mV) |  | 355 | 330 | 370 | 330 |

TABLE 2

[Results of Examples 5 to 8]

|  |  |  | Ex. 5 | Ex. 6 | Ex. 7 | Ex. 8 |
|---|---|---|---|---|---|---|
| Porous membrane | Non-conductive particles |  | Al$_2$O$_3$ | Al$_2$O$_3$ | Al$_2$O$_3$ | Al$_2$O$_3$ |
|  | Binder | Monomer | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  |  | Amount | 6 parts | 6 parts | 6 parts | 6 parts |
|  | Water-soluble polymer | Type | Daicel1220 | Daicel1220 | Daicel1220 | Daicel1220 |
|  |  | Amount | 1.5 parts | 1.5 parts | 1.5 parts | 1.5 parts |
|  | Adhesive layer |  |  |  |  |  |
| Particulate polymer | Crosslinkable monomer | Type | EDMA | EDMA | EDMA | EDMA |
|  |  | Amount | 1 wt % | 1 wt % | 1 wt % | 4.0 wt % |
|  | Core portion | Swelling degree | 6.5 times | 8.8 times | 7.1 times | 4.4 times |
|  |  | Monomer | MMA 55 2-EHA 20 MAA 4 EDMA 1 | AN 75 MAA 4 EDMA 1 | AN 65 2-EHA 10 MAA 4 EDMA 1 | AN 79 MAA 4 EDMA 4.0 |
|  |  | F monomer type | — | — | — | — |
|  |  | F monomer amount | — | — | — | — |
|  |  | Tg | 55° C. | 90° C. | 76° C. | 86° C. |
|  | Shell portion | Swelling ratio | 1.3 times | 1.3 times | 1.3 times | 1.3 times |

TABLE 2-continued

[Results of Examples 5 to 8]

|  |  |  | Ex. 5 | Ex. 6 | Ex. 7 | Ex. 8 |
|---|---|---|---|---|---|---|
|  |  | Monomer | ST 20 | ST 20 | ST 20 | ST 20 |
|  |  | Tg | 100° C. | 100° C. | 100° C. | 100° C. |
|  | Core-shell ratio |  | 10% | 10% | 10% | 10% |
|  | Cover ratio |  | 55% | 56% | 58% | 58% |
|  | MV |  | 0.45 μm | 0.45 μm | 0.45 μm | 0.45 μm |
| Optional binder | Monomer |  | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  | Amount |  | 6 parts | 6 parts | 6 parts | 6 parts |
| Others |  |  | — | — | — | — |
| Thickness |  |  | 2 μm | 2 μm | 2 μm | 2 μm |
| Ion conductivity |  | (S/cm) | $1.2 \times 10^0$ | $3.9 \times 10^0$ | $3.3 \times 10^0$ | $4.2 \times 10^0$ |
| Tensile fracture strength |  | (N/cm$^2$) | 1120 | 1100 | 780 | 900 |
| Adhesiveness |  | P(N/m) | 5.7 | 5.6 | 5.1 | 4.8 |
| Blocking resistance |  |  | A | A | A | B |
| Low temperature reception property |  | ΔW(%) | 73% | 74% | 74% | 74% |
| High temperature cycle property |  | ΔC(%) | 81.50% | 82.00% | 82.00% | 80.50% |
| Cell expansion property |  | ΔX(%) | 25% | 25% | 26% | 27% |
| Low Temperature output property |  | ΔV(mV) | 360 | 350 | 320 | 320 |

TABLE 3

[Results of Examples 9 to 12]

|  |  |  |  | Ex. 9 | Ex. 10 | Ex. 11 | Ex. 12 |
|---|---|---|---|---|---|---|---|
| Porous membrane | Non-conductive particles |  |  | Al$_2$O$_3$ | Al$_2$O$_3$ | Al$_2$O$_3$ | Al$_2$O$_3$ |
|  | Binder | Monomer |  | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  |  | Amount |  | 6 parts | 6 parts | 6 parts | 6 parts |
|  | Water-soluble polymer | Type |  | Daicel1220 | Daicel1220 | Daicel1220 | Daicel1220 |
|  |  | Amount |  | 1.5 parts | 1.5 parts | 1.5 parts | 1.5 parts |
| Adhesive layer |  |  |  |  |  |  |  |
| Particulate polymer | Crosslinkable monomer | Type |  | EDMA | EDMA | EDMA | EDMA |
|  |  | Amount |  | 1 wt % | 1 wt % | 1 wt % | 1 wt % |
|  | Core portion | Swelling degree |  | 9.6 times | 9.6 times | 9.6 times | 9.6 times |
|  |  | Monomer |  | MMA 75<br>MAA 4<br>EDMA 1 | MMA 75<br>MAA 4<br>EDMA 1 | MMA 75<br>MAA 4<br>EDMA 1 | MMA 75<br>MAA 4<br>EDMA 1 |
|  |  | F monomer type |  | — | — | — | — |
|  |  | F monomer amount |  | — | — | — | — |
|  |  | Tg |  | 91° C. | 91° C. | 91° C. | 91° C. |
|  | Shell portion | Swelling ratio |  | 2.7 times | 3.5 times | 1.7 times | 2.1 times |
|  |  | Monomer |  | ST 10<br>AN 10 | ST 5<br>AN 15 | NaSS 20 | NaSS 15<br>AN 5 |
|  |  | Tg |  | 101° C. | 102° C. | 80° C. | 82° C. |
|  | Core-shell ratio |  |  | 10% | 10% | 10% | 10% |
|  | Cover ratio |  |  | 61% | 60% | 35% | 42% |
|  | MV |  |  | 0.45 μm | 0.45 μm | 0.45 μm | 0.45 μm |
| Optional binder | Monomer |  |  | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  | Amount |  |  | 6 parts | 6 parts | 6 parts | 6 parts |
| Others |  |  |  | — | — | — | — |
| Thickness |  |  |  | 2 μm | 2 μm | 2 μm | 2 μm |
| Ion conductivity |  | (S/cm) |  | $5.1 \times 10^1$ | $7.1 \times 10^1$ | $7.8 \times 10^1$ | $6.5 \times 10^1$ |
| Tensile fracture strength |  | (N/cm$^2$) |  | 820 | 800 | 800 | 1120 |
| Adhesiveness |  | P(N/m) |  | 5.3 | 5.1 | 5.2 | 5.8 |

TABLE 3-continued

[Results of Examples 9 to 12]

|  |  | Ex. 9 | Ex. 10 | Ex. 11 | Ex. 12 |
|---|---|---|---|---|---|
| Blocking resistance |  | B | B | A | A |
| Low temperature reception property | ΔW(%) | 77% | 78% | 78% | 77% |
| High temperature cycle property | ΔC(%) | 83.50% | 83% | 82% | 81% |
| Cell expansion property | ΔX(%) | 25% | 27% | 25% | 26% |
| Low Temperature output property | ΔV(mV) | 370 | 385 | 320 | 310 |

TABLE 4

[Results of Examples 13 to 16]

|  |  |  |  | Ex. 13 | Ex. 14 | Ex. 15 | Ex. 16 |
|---|---|---|---|---|---|---|---|
| Porous membrane | Non-conductive particles |  |  | $Al_2O_3$ | $Al_2O_3$ | $Al_2O_3$ | $Al_2O_3$ |
|  | Binder | Monomer |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  |  | Amount |  | 6 parts | 6 parts | 6 parts | 6 parts |
|  | Water-soluble polymer | Type |  | Daicel1220 | Daicel1220 | Daicel1220 | Daicel1220 |
|  |  | Amount |  | 1.5 parts | 1.5 parts | 1.5 parts | 1.5 parts |
| Adhesive layer |  |  |  |  |  |  |  |
| Particulate polymer | Crosslinkable monomer | Type |  | EDMA | EDMA | EDMA | EDMA |
|  |  | Amount |  | 3.5 wt % | 1 wt % | 1 wt % | 1 wt % |
|  | Core portion | Swelling degree |  | 27.5 times | 9.7 times | 9.9 times | 10 times |
|  |  | Monomer |  | MMA 72.5 MAA 4 | MMA 74.5 MAA 4 EDMA 1 | MMA 65 MAA 4 EDMA 1 | MMA 57 MAA 4 EDMA 1 |
|  |  | F monomer type |  | — | TFEMA | TFEMA | TFEMA |
|  |  | F monomer amount |  | — | 0.5 wt % | 10 wt % | 18 wt % |
|  |  | Tg |  | 85° C. | 91° C. | 85° C. | 78° C. |
|  | Shell portion | Swelling ratio |  | 1.2 times | 1.3 times | 1.3 times | 1.3 times |
|  |  | Monomer |  | ST 20 EDMA 3.5 | ST 20 | ST 20 | ST 20 |
|  |  | Tg |  | 103° C. | 100° C. | 100° C. | 100° C. |
|  | Core-shell ratio |  |  | 10% | 10% | 10% | 10% |
|  | Cover ratio |  |  | 61% | 65% | 64% | 64% |
|  | MV |  |  | 0.45 μm | 0.45 μm | 0.45 μm | 0.45 μm |
| Optional binder | Monomer |  |  | BA 94 AN 2 MAA 2 NMA 1 AAm 1 | BA 94 AN 2 MAA 2 NMA 1 AAm 1 | BA 94 AN 2 MAA 2 NMA 1 AAm 1 | BA 94 AN 2 MAA 2 NMA 1 AAm 1 |
|  | Amount |  |  | 6 parts | 6 parts | 6 parts | 6 parts |
| Others |  |  |  | — | — | — | — |
| Thickness |  |  |  | 2 μm | 2 μm | 2 μm | 2 μm |
| Ion conductivity |  | (S/cm) |  | $1.9 \times 10^{-2}$ | $7.5 \times 10^1$ | $9.8 \times 10^1$ | $7.9 \times 10^2$ |
| Tensile fracture strength |  | (N/cm²) |  | 1200 | 1070 | 880 | 650 |
| Adhesiveness |  | P(N/m) |  | 6.3 | 5 | 4.7 | 4.5 |
| Blocking resistance |  |  |  | B | A | A | A |
| Low temperature reception property | ΔW(%) |  |  | 70% | 79% | 80% | 83% |
| High temperature cycle property | ΔC(%) |  |  | 80% | 85% | 85% | 84% |
| Cell expansion property | ΔX(%) |  |  | 27% | 20% | 21% | 21% |
| Low Temperature output property | ΔV(mV) |  |  | 300 | 270 | 240 | 210 |

TABLE 5

[Results of Examples 17 to 20]

| | | | Ex. 17 | Ex. 18 | Ex. 19 | Ex. 20 |
|---|---|---|---|---|---|---|
| Porous membrane | Non-conductive particles | | $Al_2O_3$ | $Al_2O_3$ | $Al_2O_3$ | — |
| | Binder | Monomer | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | |
| | | Amount | 6 parts | 6 parts | 6 parts | |
| | Water-soluble polymer | Type | Daicel1220 | Daicel1220 | Daicel1220 | |
| | | Amount | 1.5 parts | 1.5 parts | 1.5 parts | |
| Adhesive layer | | | | | | |
| Particulate polymer | Crosslinkable monomer | Type | EDMA | EDMA | EDMA | EDMA |
| | | Amount | 1 wt % | 3.5 wt % | 3.5 wt % | 1 wt % |
| | Core portion | Swelling degree | 9.3 times | 10.2 times | 4.1 times | 9.6 times |
| | | Monomer | MMA 65<br>MAA 4<br>EDMA 1 | MMA 87.5<br>MAA 4<br>EDMA 3.5 | MMA 52.5<br>MAA 4<br>EDMA 3.5 | MMA 75<br>MAA 4<br>EDMA 1 |
| | | F monomer type | PFPMA | — | — | — |
| | | F monomer amount | 10 wt % | — | — | — |
| | | Tg | 80° C. | 94° C. | 89° C. | 91° C. |
| | Shell portion | Swelling ratio | 1.3 times | 1.3 times | 1.3 times | 1.3 times |
| | | Monomer | ST 20 | ST 5 | ST 40 | ST 20 |
| | | Tg | 100° C. | 100° C. | 100° C. | 100° C. |
| | Core-shell ratio | | 10% | 1.50% | 28% | 10% |
| | Cover ratio | | 63% | 25.00% | 87% | 65% |
| | MV | | 0.45 μm | 0.45 μm | 0.45 μm | 0.45 μm |
| Optional binder | Monomer | | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
| | Amount | | 6 parts | 6 parts | 6 parts | 6 parts |
| Others | | | — | — | — | — |
| Thickness | | | 2 μm | 2 μm | 2 μm | 4 μm |
| Ion conductivity | | (S/cm) | $8.2 \times 10^1$ | $6.5 \times 10^1$ | $5.5 \times 10^{-5}$ | $4.5 \times 10^1$ |
| Tensile fracture strength | | (N/cm$^2$) | 650 | 1380 | 3870 | 1080 |
| Adhesiveness | | P(N/m) | 4.5 | 6.7 | 8.2 | 6.1 |
| Blocking resistance | | | A | A | A | A |
| Low temperature reception property | ΔW(%) | | 80% | 79% | 64% | 77% |
| High temperature cycle property | ΔC(%) | | 84% | 82% | 83% | 84% |
| Cell expansion property | ΔX(%) | | 22% | 23% | 23% | 25% |
| Low Temperature output property | ΔV(mV) | | 245 | 375 | 405 | 360 |

TABLE 6

Results of Examples 21 to 23

| | | | Ex. 21 | Ex. 22 | Ex. 23 |
|---|---|---|---|---|---|
| Porous membrane | Non-conductive particles | | $Al_2O_3$ | $Al_2O_3$ | $Al_2O_3$ |
| | Binder | Monomer | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
| | | Amount | 6 parts | 6 parts | 6 parts |
| | Water-soluble polymer | Type | Daicel1220 | Daicel1220 | Daicel1220 |
| | | Amount | 1.5 parts | 1.5 parts | 1.5 parts |
| Adhesive layer | | | | | |
| Particulate polymer | Crosslinkable monomer | Type | EDMA | EDMA | EDMA |
| | | Amount | 1 wt % | 1 wt % | 1 wt % |
| | Core portion | Swelling degree | 9.6 times | 9.6 times | 9.6 times |
| | | Monomer | MMA 75 | MMA 75 | MMA 75 |

TABLE 6-continued

Results of Examples 21 to 23

|  |  |  | Ex. 21 | Ex. 22 | Ex. 23 |
|---|---|---|---|---|---|
|  |  |  | MAA 4 | MAA 4 | MAA 4 |
|  |  |  | EDMA 1 | EDMA 1 | EDMA 1 |
|  |  | F monomer type | — | — | — |
|  |  | F monomer amount | — | — | — |
|  |  | Tg | 91° C. | 91° C. | 91° C. |
|  | Shell portion | Swelling ratio | 1.3 times | 1.3 times | 1.3 times |
|  |  | Monomer | ST 20 | ST 20 | ST 20 |
|  |  | Tg | 100° C. | 100° C. | 100° C. |
|  | Core-shell ratio |  | 10% | 10% | 10% |
|  | Cover ratio |  | 65% | 65% | 65% |
|  | MV |  | 0.45 μm | 0.45 μm | 0.45 μm |
| Optional binder | Monomer |  | BA 94<br>AN 2<br>MAA 2<br>NMA 1<br>AAm 1 | BA 94<br>AN 2<br>MAA 2<br>NMA 1<br>AAm 1 | — |
|  | Amount |  | 6 parts | 6 parts | — |
| Others |  |  | — | — | — |
| Thickness |  |  | 0.5 μm | 4 μm | — |
| Ion conductivity | (S/cm) |  | $4.5 \times 10^1$ | $4.5 \times 10^1$ | $4.5 \times 10^1$ |
| Tensile fracture strength | $(N/cm^2)$ |  | 1080 | 1080 | 1080 |
| Adhesiveness | P (N/m) |  | 3.8 | 8.5 | 4.7 |
| Blocking resistance |  |  | A | A | A |
| Low temperature reception property | ΔW (%) |  | 79% | 73% | 72% |
| High temperature cycle property | ΔC (%) |  | 84.70% | 86.50% | 83.0% |
| Cell expansion property | ΔX (%) |  | 24% | 20% | 24% |
| Low Temperature output property | ΔV (mV) |  | 340 | 365 | 365 |

TABLE 7

[Results of Comparative Examples 1 to 4]

|  |  |  | Comp. Ex. 1 | Comp. Ex. 2 | Comp. Ex. 3 | Comp. Ex. 4 |
|---|---|---|---|---|---|---|
| Porous membrane | Non-conductive particles |  | $Al_2O_3$ | $Al_2O_3$ | $Al_2O_3$ | $Al_2O_3$ |
|  | Binder | Monomer | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  |  | Amount | 6 parts | 6 parts | 6 parts | 6 parts |
|  | Water-soluble polymer | Type | Daicel1220 | Daicel1220 | Daicel1220 | Daicel1220 |
|  |  | Amount | 1.5 parts | 1.5 parts | 1.5 parts | 1.5 parts |
|  | Adhesive layer |  |  |  |  |  |
| Particulate polymer | Crosslinkable monomer | Type | PVDF | — | — | — |
|  |  | Amount |  | 0 wt % | 0 wt % | 0 wt % |
|  | Core portion | Swelling degree |  | 32 times | 1.3 times | 3.8 times |
|  |  | Monomer |  | MMA 70<br>AN 25<br>MAA 5 | PST | 2-EHA 60<br>ST 15<br>MAA 5 |
|  |  | F monomer type |  |  |  | — |
|  |  | F monomer amount |  |  |  | — |
|  |  | Tg |  |  |  | −25° C. |
|  | Shell portion | Swelling ratio |  |  |  | 1.3 times |
|  |  | Monomer |  |  |  | ST 20 |
|  |  | Tg | 92° C. | 100° C. | 100° C. |  |
|  | Core-shell ratio |  | — | — | 10% |  |
|  | Cover ratio |  | — | — | 51% |  |
|  | MV |  | 0.45 μm | 0.45 μm | 0.45 μm |  |

TABLE 7-continued

[Results of Comparative Examples 1 to 4]

|  |  |  | Comp. Ex. 1 | Comp. Ex. 2 | Comp. Ex. 3 | Comp. Ex. 4 |
|---|---|---|---|---|---|---|
| Optional binder | Monomer |  |  | BA 94<br>AN 2<br>MAA 2<br>NMA 1<br>AAm 1 | BA 94<br>AN 2<br>MAA 2<br>NMA 1<br>AAm 1 | BA 94<br>AN 2<br>MAA 2<br>NMA 1<br>AAm 1 |
|  | Amount |  |  | 6 parts | 6 parts | 6 parts |
| Others |  |  |  | $Al_2O_3$ | — | — |
| Thickness |  |  | 2 μm | 2 μm | 2 μm | 2 μm |
| Ion conductivity |  | (S/cm) | $2.2 \times 10^{-2}$ | $3.8 \times 10^{1}$ | $1 \times 10^{-6}$ | $2 \times 10^{-6}$ |
| Tensile fracture strength |  | (N/cm$^2$) | 380 | 250 | 3550 | 560 |
| Adhesiveness |  | P(N/m) | 0.5 | 0.2 | 6.5 | 2.5 |
| Blocking resistance |  |  | D | C | C | C |
| Low temperature reception property | ΔW(%) |  | 52% | 56% | 44% | 45% |
| High temperature cycle property | ΔC(%) |  | 75.20% | 71.80% | 71.50% | 71.80% |
| Cell expansion property | ΔX(%) |  | 45% | 55% | 50% | 52% |
| Low Temperature output property | ΔV(mV) |  | 540 | 660 | 610 | 650 |

TABLE 8

Results of Comparative Examples 5 and 6

|  |  |  | Comp. Ex. 5 | Comp. Ex. 6 |
|---|---|---|---|---|
| Porous membrane | Non-conductive particles |  | $Al_2O_3$ | $Al_2O_3$ |
|  | Binder | Monomer | BA 94<br>AN 2<br>MAA 2<br>NMA 1<br>AAm 1 | BA 94<br>AN 2<br>MAA 2<br>NMA 1<br>AAm 1 |
|  |  | Amount | 6 parts | 6 parts |
|  | Water-soluble polymer | Type | Daicel1220 | Daicel1220 |
|  |  | Amount | 1.5 parts | 1.5 parts |
|  | Adhesive layer |  |  |  |
| Particulate polymer | Crosslinkable monomer | Type | — | — |
|  |  | Amount | 0 wt % | 0 wt % |
|  | Core portion | Swelling degree | 32 times | 10.5 times |
|  |  | Monomer | MMA 50<br>AN 25<br>MAA 5 | MMA 50<br>2-EHA 25<br>MAA 5 |
|  |  | F monomer type | — | — |
|  |  | F monomer amount | — | — |
|  |  | Tg | 88° C. | 51° C. |
|  | Shell portion | Swelling ratio | 1.3 times | 4.5 times |
|  |  | Monomer | ST 20 | AN 20 |
|  |  | Tg | 100° C. | 100° C. |
|  | Core-shell ratio |  | 10% | 10% |
|  | Cover ratio |  | 52% | 54% |
|  | MV |  | 0.45 μm | 0.45 μm |
| Optional binder | Monomer |  | BA 94<br>AN 2<br>MAA 2<br>NMA 1<br>AAm 1 | BA 94<br>AN 2<br>MAA 2<br>NMA 1<br>AAm 1 |
|  | Amount |  | 6 parts | 6 parts |
| Others |  |  | — | — |
| Thickness |  |  | 2 μm | 2 μm |
| Ion conductivity |  | (S/cm) | $5 \times 10^{-3}$ | $8 \times 10^{-2}$ |
| Tensile fracture strength |  | (N/cm$^2$) | 390 | 370 |
| Adhesiveness |  | P (N/m) | 0.7 | 0.3 |
| Blocking resistance |  |  | C | C |
| Low temperature reception property | ΔW (%) |  | 51% | 58% |

TABLE 8-continued

Results of Comparative Examples 5 and 6

|  |  | Comp. Ex. 5 | Comp. Ex. 6 |
|---|---|---|---|
| High temperature cycle property | ΔC (%) | 72% | 73% |
| Cell expansion property | ΔX (%) | 48% | 48% |
| Low Temperature output property | ΔV (mV) | 610 | 590 |

DISCUSSION

From the results of Examples and Comparative Examples, it has been confirmed that the particulate polymer of the present invention is excellent in adhesiveness in the electrolytic solution and the battery properties of the lithium ion secondary battery, such as the low temperature output property, can be improved by employment of the particulate polymer of the present invention.

The invention claimed is:

1. A particulate polymer for a binder of a lithium ion secondary battery, wherein
the particulate polymer has a core-shell structure including a core portion and a shell portion partially covering an outer surface of the core portion,
an average ratio of the outer surface of the core portion that is covered by the shell portion is equal to or higher than 10% and equal to or lower than 99.9%,
a polymer forming the core portion of the particulate polymer contains a (meth)acrylic acid ester monomer unit and a (meth)acrylonitrile monomer unit,
a glass transition temperature of the polymer forming the core portion is equal to or higher than 60° C.,
a polymer forming the shell portion of the particulate polymer contains a styrene unit and/or a styrene derivative unit,
a ratio of the styrene unit and/or the styrene derivative unit in the polymer forming the shell portion is equal to or higher than 85% by weight,
a glass transition temperature of the polymer forming the shell portion is equal to or higher than 70° C., and
ion conductivity of a film of 1 mm in thickness formed by drying an aqueous dispersion of the particulate polymer after being immersed in an electrolytic solution ($LiPF_6$ solution of 1.0 mol/L (solvent: a mixture of ethylene carbonate/diethyl carbonate/vinylene carbonate at a volume ratio of 68.5/30/1.5)) at 60° C. for 72 hours is $1 \times 10^{-5}$ S/cm to $1 \times 10^3$ S/cm, and tensile strength of the film is 500 $N/cm^2$ to 4000 $N/cm^2$.

2. The particulate polymer according to claim 1, wherein a volume average particle diameter of the particulate polymer is 0.01 μm to 1 μm.

3. The particulate polymer according to claim 1, wherein the polymer forming the core portion of the particulate polymer contains the (meth)acrylic acid ester monomer unit and the (meth)acrylonitrile monomer unit at equal to or higher than 50% by weight in total.

4. The particulate polymer according to claim 1, wherein the polymer forming the core portion of the particulate polymer contains a crosslinkable monomer unit.

5. The particulate polymer according to claim 1, wherein the polymer forming the core portion of the particulate polymer contains a fluorine group-containing monomer unit.

6. An adhesive layer for effecting adhesion between members included in a lithium ion secondary battery, wherein the adhesive layer contains the particulate polymer according to claim 1.

7. A porous membrane composition comprising non-conductive particles, and the particulate polymer according to claim 1.

8. The particulate polymer according to claim 1, wherein the average ratio of the outer surface of the core portion that is covered by the shell portion is equal to or higher than 60% and equal to or lower than 85%.

* * * * *